(12) United States Patent
Tsuge et al.

(10) Patent No.: US 7,643,421 B2
(45) Date of Patent: Jan. 5, 2010

(54) PACKET FORWARDING APPARATUS

(75) Inventors: Munetoshi Tsuge, Sagamihara (JP); Ken Oouchi, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 568 days.

(21) Appl. No.: 11/291,821

(22) Filed: Dec. 2, 2005

(65) Prior Publication Data

US 2006/0209688 A1 Sep. 21, 2006

(30) Foreign Application Priority Data

Mar. 2, 2005 (JP) ............................. 2005-056777

(51) Int. Cl.
*H04L 12/26* (2006.01)
(52) U.S. Cl. ...................................... 370/235; 370/353
(58) Field of Classification Search ................. 370/230, 370/230.1, 231–233, 235, 236, 352–356, 370/465, 466; 709/227, 239, 240, 244
See application file for complete search history.

(56) References Cited

U.S. PATENT DOCUMENTS

| | | | | |
|---|---|---|---|---|
| 6,738,383 B1 * | 5/2004 | Kliland et al. | .............. | 370/401 |
| 6,788,692 B1 * | 9/2004 | Boudreau et al. | ........... | 370/400 |
| 6,795,867 B1 * | 9/2004 | Ma et al. | ..................... | 709/240 |
| 7,174,378 B2 * | 2/2007 | Yoon et al. | .................. | 709/225 |
| 7,203,762 B2 * | 4/2007 | Yamada et al. | .............. | 709/238 |
| 7,284,067 B2 * | 10/2007 | Leigh | ......................... | 709/238 |
| 2003/0135625 A1 * | 7/2003 | Fontes et al. | ................ | 709/228 |
| 2006/0045088 A1 * | 3/2006 | Nguyen | ...................... | 370/392 |
| 2008/0101391 A1 * | 5/2008 | Au et al. | ..................... | 370/401 |

FOREIGN PATENT DOCUMENTS

| | | | |
|---|---|---|---|
| EP | 1014633 A2 * | 6/2000 | |
| JP | 2003-152783 | 11/2001 | |
| WO | WO 03/103233 A1 | 5/2002 | |
| WO | WO 2007045561 A1 * | 4/2007 | |

OTHER PUBLICATIONS

Chimmanee, S. et al., "Application Routing Load Balancing (ARLB) to Support QoS for VoIP Application Over a VPNs Environment," IEEE International symposium on Network computing and Applications, 2001. NCA 2001. Oct. 2001. pp. 94-99.*
Office Action from the Japanese Patent Office dated Jun. 9, 2009, in Japanese.

* cited by examiner

*Primary Examiner*—Donald L Mills
(74) *Attorney, Agent, or Firm*—Stites & Harbison PLLC; Juan Carlos A. Marquez, Esq.

(57) ABSTRACT

A BAS/load balancer which combines the functions of a BAS (Broadband Access Server) providing a dynamic network connection to a user network, and a load balancing relaying the communications traffic of the user network to one of plural load balancing target apparatuses, and which can apply an arbitrary load balancing algorithm. When the BAS/load balancer of the invention sets up a dynamic connection between the user networks, the balancer determines the load balancing target apparatus which is a relay destination using an arbitrary load balancing algorithm for both send and receive communications traffic in the user network.

20 Claims, 26 Drawing Sheets

FIG. 3

| VR-ID | DESTINATION IP PREFIX | ROUTE TYPE | NEXT HOP IP ADDRESS | OUTPUT I/F, SESSION ID |
|---|---|---|---|---|
| V-BAS1 | 1.1.10.0/30 | DIRECTLY CONNECTED | | B0 |
| V-BAS1 | 1.1.1.0/24 | DIRECTLY CONNECTED | | B11 |
| V-BAS1 | 1.1.3.0/24 | DIRECTLY CONNECTED | | B12 |
| V-BAS1 | 1.2.1.1/32 | DIRECTLY CONNECTED | | B2/P1 |
| V-BAS1 | 1.2.1.2/32 | DIRECTLY CONNECTED | | B2/P2 |
| V-BAS1 | 1.2.1.3/32 | DIRECTLY CONNECTED | | B2/P3 |
| V-BAS1 | 1.2.1.4/32 | DIRECTLY CONNECTED | | B2/P4 |
| V-BAS1 | 0.0.0.0/0 | NOT DIRECTLY CONNECTED | 1.1.10.2 | B0 |
| V-LB1 | 1.1.10.0/30 | DIRECTLY CONNECTED | | L0 |
| V-LB1 | 1.1.2.0/24 | DIRECTLY CONNECTED | | L11 |
| V-LB1 | 1.1.4.0/24 | DIRECTLY CONNECTED | | L12 |
| V-LB1 | 1.1.20.0/30 | DIRECTLY CONNECTED | | L2 |
| V-LB1 | 1.2.1.0/24 | NOT DIRECTLY CONNECTED | 1.1.10.1 | L0 |
| V-LB1 | 0.0.0.0/0 | NOT DIRECTLY CONNECTED | 1.1.20.2 | L2 |

FIG. 4

| VR-ID 401 | I/F-ID 402 | SESSION ID 403 | ASSIGNED IP PREFIX 404 |
|---|---|---|---|
| V-BAS1 | B2 | P1 | 1.2.1.1/32 |
| V-BAS1 | B2 | P2 | 1.2.1.2/32 |
| V-BAS1 | B2 | P3 | 1.2.1.3/32 |
| V-BAS1 | B2 | P4 | 1.2.1.4/32 |

| VR-ID 501 | I/F-ID 502 | IP ADDRESS OF I/F 503 | LENGTH OF NET MASK 504 | VIRTUAL LINE ID 505 |
|---|---|---|---|---|
| V-BAS1 | B0 | 1.1.10.1 | 30 | BL0 |
| V-BAS1 | B11 | 1.1.1.10 | 24 | |
| V-BAS1 | B12 | 1.1.3.10 | 24 | |
| V-BAS1 | B2 | 1.2.1.254 | 24 | |
| V-LB1 | L0 | 1.1.10.2 | 30 | BL0 |
| V-LB1 | L11 | 1.1.2.10 | 24 | |
| V-LB1 | L12 | 1.1.4.10 | 24 | |
| V-LB1 | L2 | 1.1.20.1 | 30 | |

215, 235

235-A (rows V-BAS1)

FIG. 6

| 213 | V-BAS'S VR-ID 601 | TARGET NEXT HOP IP ADDRESS ON V-BAS SIDE 602 | FORWARDING DESTINATION IP ADDRESS FROM V-BAS 603 | V-LB'S VR-ID 604 | TARGET NEXT HOP IP ADDRESS ON V-LB SIDE 605 | FORWARDING DESTINATION IP ADDRESS FROM V-LB 606 |
|---|---|---|---|---|---|---|
| | V-BAS1 | 1.1.10.2 | 1.1.1.1 | V-LB1 | 1.1.10.1 | 1.1.2.1 |
| | V-BAS1 | 1.1.10.2 | 1.1.3.2 | V-LB1 | 1.1.10.1 | 1.1.4.2 |
| | V-BAS1 | 1.1.10.2 | 1.1.3.3 | V-LB1 | 1.1.10.1 | 1.1.4.3 |

FIG. 7

| | LB FORWARDING TABLE FOR V-BAS | | | | | LB FORWARDING TABLE FOR V-LB | | | |
|---|---|---|---|---|---|---|---|---|---|
| VR-ID ON V-BAS SIDE | TEMPORARY NEXT HOP IP ADDRESS | INPUT SESSION ID | NEXT HOP IP ADDRESS | OUTPUT I/F-ID | | VR-ID ON V-LB SIDE | TEMPORARY NEXT HOP IP ADDRESS | DESTINATION IP PREFIX | NEXT HOP IP ADDRESS | OUTPUT I/F-ID |
| V-BAS1 | 1.1.10.2 | B2/P1 | 1.1.1.1 | B11 | | V-LB1 | 1.1.10.1 | 1.2.1.1/32 | 1.1.2.1 | L11 |
| V-BAS1 | 1.1.10.2 | B2/P2 | 1.1.3.2 | B12 | | V-LB1 | 1.1.10.1 | 1.2.1.2/32 | 1.1.4.2 | L12 |
| V-BAS1 | 1.1.10.2 | B2/P3 | 1.1.3.3 | B12 | | V-LB1 | 1.1.10.1 | 1.2.1.3/32 | 1.1.4.3 | L12 |
| V-BAS1 | 1.1.10.2 | B2/P4 | 1.1.1.1 | B11 | | V-LB1 | 1.1.10.1 | 1.2.1.4/32 | 1.1.2.1 | L11 |

FIG. 14

| VR-ID 301 | DESTINATION IP PREFIX 302 | ROUTE TYPE 303 | NEXT HOP IP ADDRESS 304 | OUTPUT I/F, SESSION ID 305 |
|---|---|---|---|---|
| V-BAS1 | 1.1.10.0/30 | DIRECTLY CONNECTED | | B0 |
| V-BAS1 | 1.2.1.1/32 | DIRECTLY CONNECTED | | B2/P1 |
| V-BAS1 | 1.2.1.2/32 | DIRECTLY CONNECTED | | B2/P2 |
| V-BAS1 | 1.2.1.3/32 | DIRECTLY CONNECTED | | B2/P3 |
| V-BAS1 | 1.2.1.4/32 | DIRECTLY CONNECTED | | B2/P4 |
| V-BAS1 | 0.0.0.0/0 | NOT DIRECTLY CONNECTED | 1.1.10.2 | B0 |

| VR-ID 501 | I/F-ID 502 | IP ADDRESS OF I/F 503 | LENGTH OF NET MASK 504 | VIRTUAL LINE ID 505 | LOAD BALANCING TARGET I/F-ID 1506 |
|---|---|---|---|---|---|
| V-BAS1 | B0 | 1.1.10.1 | 30 | BL0 | B0 |
| V-BAS1 | B11 | | | | B0 |
| V-BAS1 | B12 | | | | B0 |
| V-BAS1 | B13 | | | | B0 |
| V-BAS1 | B2 | 1.2.1.254 | 24 | | |
| V-LB1 | L0 | | | BL0 | L0 |
| V-LB1 | L11 | | | | L0 |
| V-LB1 | L12 | | | | L0 |
| V-LB1 | L13 | | | | L0 |
| V-LB1 | L2 | | | | |

| 213 | 601 V-BAS'S VR-ID | 1602 TARGET I/F-ID ON V-BAS SIDE | 1603 OUTPUT I/F-ID FROM V-BAS | 604 V-LB'S VR-ID | 1605 TARGET I/F-ID ON V-LB SIDE | 1606 OUTPUT I/F-ID FROM V-LB |
|---|---|---|---|---|---|---|
| | V-BAS1 | B0 | B11 | V-LB1 | L0 | L11 |
| | V-BAS1 | B0 | B12 | V-LB1 | L0 | L12 |
| | V-BAS1 | B0 | B13 | V-LB1 | L0 | L13 |

LB FORWARDING TABLE FOR V-BAS (701)

| VR-ID ON V-BAS SIDE (711) | TEMPORARY OUTPUT I/F-ID (1712) | INPUT SESSION ID (713) | OUTPUT I/F-ID (715) |
|---|---|---|---|
| V-BAS1 | B0 | B2/P1 | B11 |
| V-BAS1 | B0 | B2/P2 | B12 |
| V-BAS1 | B0 | B2/P3 | B13 |
| V-BAS1 | B0 | B2/P4 | B11 |

LB FORWARDING TABLE FOR V-LB (702)

| VR-ID ON V-LB SIDE (721) | TEMPORARY OUTPUT I/F-ID (1722) | DESTINATION IP PREFIX (723) | OUTPUT I/F-ID (725) |
|---|---|---|---|
| V-LB1 | L0 | 1.2.1.1/32 | L11 |
| V-LB1 | L0 | 1.2.1.2/32 | L12 |
| V-LB1 | L0 | 1.2.1.3/32 | L13 |
| V-LB1 | L0 | 1.2.1.4/32 | L11 |

FIG. 22

| VR-ID | I/F-ID | SESSION ID | ASSIGNED IP PREFIX | SERVICE LEVEL ID |
|---|---|---|---|---|
| V-BAS1 | B2 | P1 | 1.2.1.1/32 | 0 |
| V-BAS1 | B2 | P2 | 1.2.1.2/32 | 2 |
| V-BAS1 | B2 | P3 | 1.2.1.3/32 | 1 |
| V-BAS1 | B2 | P4 | 1.2.1.4/32 | 2 |

FIG. 23

| V-BAS'S VR-ID | TARGET NEXT HOP IP ADDRESS ON V-BAS SIDE | FORWARDING DESTINATION IP ADDRESS FROM V-BAS | V-LB'S VR-ID | TARGET NEXT HOP IP ADDRESS ON V-LB SIDE | FORWARDING DESTINATION IP ADDRESS FROM V-LB | SERVICE LEVEL ID |
|---|---|---|---|---|---|---|
| V-BAS1 | 1.1.10.2 | 1.1.1.1 | V-LB1 | 1.1.10.1 | 1.1.2.1 | 1 |
| V-BAS1 | 1.1.10.2 | 1.1.3.2 | V-LB1 | 1.1.10.1 | 1.1.4.2 | 2 |
| V-BAS1 | 1.1.10.2 | 1.1.3.3 | V-LB1 | 1.1.10.1 | 1.1.4.3 | 2 |

FIG. 24

| LB FORWARDING TABLE FOR V-BAS | | | | | LB FORWARDING TABLE FOR V-LB | | | | |
|---|---|---|---|---|---|---|---|---|---|
| VR-ID ON V-BAS SIDE | TEMPORARY NEXT HOP IP ADDRESS | INPUT SESSION ID | NEXT HOP IP ADDRESS | OUTPUT I/F-ID | VR-ID ON V-LB SIDE | TEMPORARY NEXT HOP IP ADDRESS | DESTINATION IP PREFIX | NEXT HOP IP ADDRESS | OUTPUT I/F-ID |
| V-BAS1 | 1.1.10.2 | B2/P2 | 1.1.3.2 | B12 | V-LB1 | 1.1.10.1 | 1.2.1.2/32 | 1.1.4.2 | L12 |
| V-BAS1 | 1.1.10.2 | B2/P3 | 1.1.1.1 | B11 | V-LB1 | 1.1.10.1 | 1.2.1.3/32 | 1.1.2.1 | L11 |
| V-BAS1 | 1.1.10.2 | B2/P4 | 1.1.3.3 | B12 | V-LB1 | 1.1.10.1 | 1.2.1.4/32 | 1.1.4.3 | L12 |

PACKET FORWARDING APPARATUS

CLAIM OF PRIORITY

The present application claims priority from Japanese application JP 2005-056777 filed on Mar. 2, 2005, the content of which is hereby incorporated by reference into this application.

FIELD OF THE INVENTION

The invention relates to a router, especially a router installed in an access network, to a method of providing a router with a communications traffic load balancing relay function, and to a router provided with a load balancing relay function.

BACKGROUND OF THE INVENTION

In a network, if communication is performed between a host and another host, various processes will be performed in these terminal hosts, such as servers, client terminals, for example, and a communication relay apparatus, such as a router or firewall, for example, located midway between them. Each processing load will vary respectively with the total amount of traffic to be processed, and the complexity of the processing itself. Therefore, some processes will heavily load the system and may create a bottleneck affecting the communication performance between terminal hosts.

In one load balancing relay technique, this is avoided or mitigated by providing plural apparatuses that perform the same processes, and distributing the communications traffic to those apparatuses.

The load balancing relay technique, depending on the application, may be terminal host, such as a server, load balancing or communication relay apparatus load balancing, such as a firewall. The first technique of terminal host load balancing is a method using a load balancer (load balance relay apparatus), or a method using a DNS (Domain Name System) server. The second technique of communication relay apparatus load balancing is a method of using a load balancer such as that used for terminal hosts, or a method of using an autonomous load balancing function of the apparatus that performs a load balancing process.

When traffic arrives from a certain interface, this load balancer has a function to select one of the plural apparatuses that use a predetermined algorithm and perform a load balancing process, and relay traffic to that apparatus. This predetermined algorithm (load balance algorithm) may calculate a hash value based on header information such as the sender's IP (Internet Protocol) address or destination IP address to determine the relay apparatus, the algorithm may determine the relay apparatus by a round robin algorithm, or the algorithm may take the relay apparatus with the lightest load (or which has the least number of hosts or number of flows) as the load balancing target apparatus.

In load balancing for terminal hosts using a load balancer, the load balancing target apparatus (in this example, a terminal host such as a server) is located at a communications traffic terminal. Therefore, the load balancer is situated only on the route between load balancing target apparatuses and terminal hosts which communicate with them. Only the communications traffic from the terminal host to the load balancing target apparatus is subjected to a load balancing relay process. On the other hand, the communications traffic from the load balancing target apparatus to the terminal host is merely relayed to the interface to the latter terminal host.

Therefore, the load balancing algorithm used by the load balancer may be a hash, round-robin, load of the load balancing target apparatus or the number of assignment flows.

In general, in the load balancing target apparatus in terminal host-oriented load balancing, server software of a specific application is operating. If this application is accompanied by user authentication, the load-balancing target apparatus will grasp the correspondence between communications traffic and client user data. In addition, the load balancing target apparatus and load balancer are often managed and operated by the same administrator. For this reason, a service that is different for each user can also be applied using a special load balancer (for example, JP-A No. 152783/2003, referred herein as Patent document 1). Patent document 1 describes a load balancer that can provide a different service for every user by determining the priority corresponding to a SSL (Secure Socket Layer) session identifier, and transmitted to the load balancer.

In the case of load balancing for a communication relay apparatus using a load balancer, the load balancing target apparatus (in this example, a communication relay apparatus such as a firewall) is situated in the middle instead of at the ends of the communications traffic. Therefore, a load balancer is situated on both sides of the load balancing target apparatus, and communications traffic reaching the load balancer on the network side is relayed by the load balancer from one network, such as a network in a company, for example, to one of plural load balancing target apparatuses. The traffic is then relayed to another network, such as the Internet, for example, via the load balancing target apparatus and the other load balancer. The same is true of traffic in the opposite direction.

Many load balancing target apparatuses, in order to correctly perform processing in the apparatus, require that communication between the same terminal hosts passes through the same load balancing target apparatus in the outgoing and incoming directions. Therefore, the load balancers on both sides of the load balancing target apparatus relay communications traffic in the outgoing and incoming directions via the same load balancing target apparatus using one of the following two techniques.

(1) If the combination of the destination IP address and sender IP address is the same, a load balancing algorithm such as hash which can uniquely determine the same relay destination apparatus, is always used.

(2) One load balancer observes the packet which the other load balancer transmitted via the load balancing relay, the combination of the sender and destination IP address and the load balancing target apparatus through which it passed is stored, and if a packet comes in the opposite direction, the relay destination apparatus is determined based on the information.

In the case of load balancing for a communication relay apparatus using the autonomous load balancing function of the load balancing target apparatus, load balancing target apparatuses receive communications traffic, and the apparatus determines whether it should process the traffic. Only the apparatus that determines that it should process the traffic, processes and relays the traffic, and other apparatuses discard the traffic. Each apparatus determines whether it should process the traffic, therefore, as in (1) where a load balancer was used, even if the load balancing algorithm performs the calculation on its own, it is limited to an algorithm (hash, etc.) which always give a meaningful result.

In load balancing for the communication relay apparatus, the load balancer and load balancing target apparatus are situated at the midpoint of the communications traffic. In general, at the midpoint of this communication, the information for obtaining a correspondence between the communications traffic and terminal host user consists of only the IP address. Therefore, it is impossible to perform processing which provides a different service for every user by the load balancer except for the case where a fixed IP address is assigned to the user host, and the administrator of the load balancer knows the assignment.

On the other hand, the ISP (Internet Service Provider) receives an Internet access demand from a user host, and user authentication is performed. In order to provide a connection, an apparatus known as a BAS (Broadband Access Server) is used. The BAS is generally in a position nearest to the user in the layer 3 packet relay apparatus (router) of the ISP (or access-line contractor who provides a circuit between the user and ISP to the ISP). The BAS has a correspondence between the layer 2 session for each user by PPP (Point to Point Protocol) or VLAN (Virtual Local Area Network), or an IP address dynamically assigned to the user by PPP or DHCP (Dynamic Host Configuration Protocol), and information about the user including a user identifier. Hence, although the BAS is an apparatus located at the midpoint between the user host and a server that is on the Internet, it is an apparatus which can make a correspondence between communications traffic and user data. Therefore, it may be considered that by using the BAS, an ISP can provide a different level of service for every user, such as a security service by a firewall, for example.

In this specification, "layer 2" refers to the data link layer of an OSI (Open Systems Interconnection) reference model. "Layer 3" refers to the network layer of an OSI reference model. In the invention, it is assumed that IP (IPv4 or IPv6) is used for the layer 3 protocol.

If it is attempted to provide a secure service to a user using security apparatuses such as a BAS and a firewall, the difference of packet relay performance between the BAS and the security apparatus will pose a problem. For example, at present the relay performance of a BAS even for a low performance model is 1 Gigabit/second, but a highly efficient firewall of the type which can inspect a TCP (Transmission Control Protocol)/UDP (User Datagram Protocol) payload of a packet, even for a high performance model, has an upper limit of about 500 Megabits per second. It may further be expected that due to factors such as improvement in network forwarding performance, improvement in processing performance of terminal hosts and improved attack techniques, at the same time as the relay performance of communication relay apparatuses which do not offer advanced security functions such as BAS or routers improves, advanced security apparatuses such as firewalls will become even more sophisticated. Therefore, the relay performance gap between BAS, routers and security apparatuses may widen in future.

Under such conditions, in order to obtain a security processing performance of a degree in which a security service can be provided for most users under a BAS, load balancing of the security apparatus is effective.

However, in load balancing using prior art technology, it is necessary to provide a load balancer separate from the BAS or load balancing target apparatus (security apparatus), or the load balancing target apparatus needs to have an autonomous load balancing function. In the former method, financial cost may increase and packet forwarding performance may suffer due to the introduction of the load balancer. Moreover, in the case of (1) above, the load balancing algorithm is limited to hash or the like, so the load balancing performance desired by an administrator may not be obtained. In the case of (2) above, the load balancer on the other side needs to supervise the packet which passed through one load balancer, so packet forwarding performance may further decrease. Regarding the latter autonomous load balancing function, a load balancing target apparatus with this function would be expensive and the load balancing algorithm would be limited as in the case of (1).

In general, an IP address is dynamically assigned to a user host under the BAS, and neither the usual load balancer nor the load balancing target apparatus with an autonomous load balancing function has a means to acquire user data from other servers dynamically. Therefore, these apparatuses cannot determine a distribution destination based on user data, and a different service for every user cannot be provided.

Therefore there is a need to perform load balancing of a communication relay apparatus such as a firewall at the position of a BAS, to provide a load balancing relay method which is low cost, offers high forwarding performance and uses an arbitrary load balancing algorithm, and to provide a BAS/load balancer compatible therewith. There is further a need to provide a load balancing relay method which can apply different load balancing relay processing for every user where the BAS assigns a user host layer 2 session and an IP address dynamically, and a BAS/load balancer compatible therewith.

SUMMARY OF THE INVENTION

In the invention, the load balancing function which is located on both sides of the load balancing target apparatus is housed in the same apparatus as the BAS. When a user host's layer 2 session is activated or an IP address is assigned to a user host, the load balancing target apparatus to which traffic is to be relayed is simultaneously determined using an arbitrary load balancing algorithm in the direction of traffic from the user host to the ISP, or from the ISP or Internet to the user host. For communications traffic from the user host, this relay destination information is the correspondence between the user host's layer 2 session identifier or IP address (or the IP address prefix), and the interface identifier or IP address (or layer 2 address) of the relay destination. For communications traffic from the ISP, it is the correspondence between the user host's IP address (or IP address prefix) and the interface identifier or IP address (or layer 2 address) of the relay destination.

When the BAS/load balancer of the invention relays a packet from the user host to the ISP or the Internet, the load balancing target apparatus to which traffic is to be relayed is determined using the layer 2 session identifier of a packet which arrived or the sender IP address of the packet, and the relay destination information mentioned above. The packet is then relayed to the load balancing target apparatus. When relaying a packet from the ISP to the user host, the load balancing target apparatus of the relay destination is determined using the destination IP address of the delivered packet, and the relay destination information mentioned above. The packet is then relayed to the load balancing target apparatus. By the above processing, the BAS/load balancer of the invention relays a packet which arrived from the user host or ISP to the load balancing target apparatus. A packet which arrived from the load balancing target apparatus is relayed by the BAS/load balancer of the invention as by an ordinary BAS.

In the invention, in order to permit application of different load balancing processing for every user, a service level identifier is matched with the user and load balancer. When the BAS/load balancer of the invention performs user authentication, it obtains the service level identifier corresponding to the user from an external authentication server or an internal setting. This service level identifier and the service level identifier assigned beforehand to every load balancing target apparatus are compared, and only those that match are taken as relay destination candidates. From among these relay destination candidates, the load balancing target apparatus of the relay destination is determined using an arbitrary load balancing algorithm. Due to the above processing, the user host's communications traffic passes only through a load balancing target apparatus whose level matches the user's service level. If there are plural load balancing target apparatuses having the same service level as the user, one relay destination apparatus can be selected from among them using an arbitrary load balancing algorithm.

Hence, according to the invention, when a user host's layer 2 session is activated or IP address is assigned, the correspondence between the user and load balancing target apparatus is simultaneously determined for traffic in both the outgoing and incoming directions. Therefore, an arbitrary algorithm can be used for the load balancing algorithm, and it is easy to obtain the load balancing performance desired by the administrator. Also, according to the present invention, the BAS and load balancer are combined into one, and when communications traffic is relayed from the user host to the load balancing target apparatus, the user host's layer 2 session identifier is used to determine the relay destination. This is not only advantageous in respect of the cost of the apparatus itself, or apparatus-management cost, but compared with the case where the BAS and load balancer are provided separately, better packet forwarding performance can be expected. Moreover, the load balancing target apparatus need not have a special function such as an autonomous load balancing function.

In the invention, the selection of load balancing relay destination is limited only to load balancing target apparatuses which assign a service level identifier to both the user data and the load balancing target apparatus, where the user data and service level identifier match. Due to this, even when the layer 2 session identifier and IP address assigned to the user host vary dynamically, a different service level can be provided for every user, and load balancing relay processing can also be performed.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts:

FIG. 3 is a diagram showing an IP packet forwarding table according to an aspect of the present invention.

FIG. 4 is a diagram showing a session management table according to an aspect of the present invention.

FIG. 5 is a diagram showing an interface table according to an aspect of the present invention.

FIG. 6 is a diagram showing a load balancing target candidate table according to an aspect of the present invention.

FIG. 7 is a diagram showing a load balancing forwarding table according to an aspect of the present invention.

FIG. 14 is a diagram showing an IP packet forwarding table according to an aspect of the present invention.

FIG. 15 is a diagram showing an interface table according to an aspect of the present invention.

FIG. 16 is a diagram showing the load balancing target candidate table according to an aspect of the present invention.

FIG. 17 is a diagram showing the load balancing forwarding table according to an aspect of the present invention.

FIG. 22 is a diagram showing the session management table according to an aspect of the present invention.

FIG. 23 is a diagram showing the load balancing target candidate table according to an aspect of the present invention.

FIG. 24 is a diagram showing the load balancing forwarding table according to an aspect of the present invention.

DETAILED DESCRIPTION

It is to be understood that the figures and descriptions of the present invention have been simplified to illustrate elements that are relevant for a clear understanding of the present invention, while eliminating, for the purpose of clarity, many other elements found in a packet forwarding apparatus and methods and hardware associated with packets. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
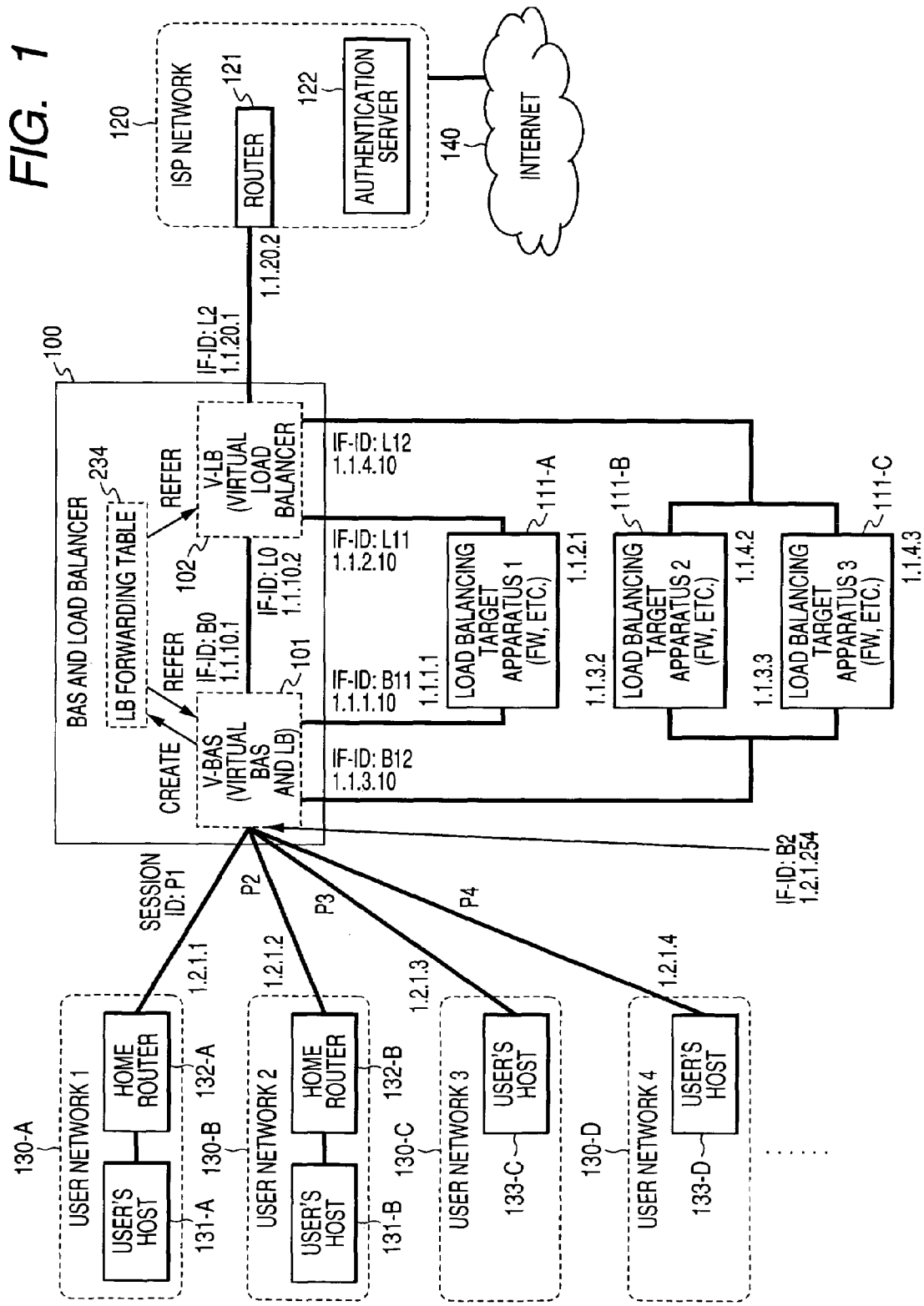
FIG. 1 is a diagram showing a network configuration according to an aspect of the present invention, and a virtual internal configuration of the communication apparatus of the invention.

FIG. 1 is a diagram showing the network configuration and the virtual internal configuration of the communication apparatus according to an aspect of this invention. In this aspect, the BAS/load balancer 100 of the invention is placed between the user network 130 and ISP network 120. It is assumed in this aspect that a service is provided which connects a user to the Internet, so the ISP network 120 is connected to the Internet 140. However, the network connection service provided to a user in the present invention is not necessarily a connection service to the Internet. For example, it may be a VPN (Virtual Private Network) Service which provides a virtual closed network known as a Private Network, and which interconnects plural user networks.

The BAS/load balancer 100 of the invention is connected to an ISP network edge router 121 by a logical or physical connection. In this aspect, it is assumed that the BAS/load balancer 100 of the invention is situated in a network owned by a different access-line contractor from the ISP network 120, and that the ISP network edge router 121 is situated inside the ISP network 120. However, the invention can be applied regardless of the position of the systematic boundary between the access-line contractor and the ISP. In other words, the ISP network edge router 121 may be situated outside the ISP network 120, or both the BAS/load balancer 100 of the invention and the ISP network edge router 121 may be situated inside the ISP network 120.

The BAS/load balancer 100 of the invention sets up a network connection between these home routers 132 or user hosts 133 in response to a network connection demand from the home router 132 or user host 133 in each of the user networks 130. When this network connection setup process is completed, the user host 131 inside the user network in which the user host 133 and home router 132 are located, can receive a network connection service, such as the Internet access service provided by the ISP, for example.

This network connection setup process includes one or both of dynamic setup of a layer 2 session between the BAS/load balancer 100 and the home router 132 or user host 133 (layer 2 logical circuit), and dynamic assignment of an IP address to the home router 132 or user host 133. For example, when PPP is used for the layer 2 session which connects the BAS/load balancer 100 and the home router 132 or user host 133, it is common to perform both dynamic setup of a layer 2 session and dynamic assignment of an IP address.

In general, the BAS/load balancer 100 performs a user authentication process in order to determine whether a user should be provided with a network connection. Specifically, the user authentication process is performed when a network connection demand is received from the home router 132 or user host 133. As a result of the authentication process, the network connection setup process is performed when it becomes clear that it is a user whose connection should be granted. According to aspect of the present invention, it is not absolutely necessary to perform this user authentication process. According to aspects of the present invention described later, it is necessary to perform this user authentication process.

When performing the user authentication process, the authentication server 122 generally holds user data for performing the user authentication process. When the BAS/load balancer 100 of the invention performs the user authentication process, it transmits the user authentication information, such as a user name and password, for example, received from the home router 132 or user host 133 to this authentication server 122. The authentication server then returns license information as to whether the user may be provided with a network connection, and additional information, if required. The BAS/load balancer 100 of the invention performs the network connection setup process when license information that the user should be provided with a network connection is returned.

To send and receive authentication/license information or additional information between the BAS/load balancer 100 of the invention and the authentication server 122, RADIUS (Remote Authentication Dial-In User Service), which is an authentication protocol generally used, can be applied. However, the invention is not limited to this kind of authentication protocol. According to an aspect of the present invention, the authentication server 122 i-s situated inside the ISP network 120 is assumed. However, in implementing the invention, as long as the authentication server 122 is in a location such that it can communicate with the BAS/load balancer 100 of the invention, it may be situated anywhere, and a functional equivalent to the authentication server 122 may also be incorporated in the BAS/load balancer 100 of the present invention.

In the BAS/load balancer 100 according to an aspect of the present invention, there are two virtual routers, such as the virtual BAS/load balancer 101 and virtual load balancer 102, for example. As to operation (network configuration, packet I/O, setup by administrator) which is visible from outside the BAS/load balancer 100 of the invention, each virtual router functions like an independent router. However, as discussed hereinbelow regarding the internal processing architecture of the apparatus, it is not necessary that each virtual router is independent. Hereafter, a virtual router will be referred to as VR, a virtual BAS/load balancer V-BAS will be referred to as a Virtual BAS, and a virtual load balancer will be referred to as a V-LB.

In the network architecture, V-BAS 101 is situated on the side near the user network 130 in the BAS/load balancer 100. On the other hand, V-LB 102 is situated on the side near the ISP network 120 in the BAS/load balancer 100. V-BAS 101 and V-LB 102 are mutually connected by a virtual line provided inside the BAS/load balancer 100. This virtual line does not actually need to be provided in the internal processing architecture of the apparatus, as discussed below.

V-BAS 101 receives a network connection demand from a user, and if required, will perform a user authentication process to establish a network connection. If a network connection is established, an IP address is assigned to the user's home router 132 or user host 133, and these apparatuses and V-BAS 101 will be in a state where they are connected by a physical or logical circuit. V-BAS 101 is connected with plural load balancing target apparatuses 111 by one or more physical or logical circuits.

In this aspect, V-BAS 101 relays a packet addressed to the ISP network 120 or the Internet 140 that arrived from the user network 130, to one of the plural load balancing target apparatuses 111. In implementing the invention, a packet that arrived from user network 130 may be relayed to one of the plural load balancing target apparatuses 111, or one of the virtual lines connected to V-LB 102. V-BAS 101 relays a packet addressed to the user network 130 that was received from one of the plural load balancing target apparatuses 111, or one of the virtual lines connected to V-LB 102, to the user network 130 that is the destination.

The V-LB 102 is connected with the plural load balancing target apparatuses 111 by one or more physical or logical circuits. In this aspect, V-LB 102 relays a packet addressed to the destination user network 130 which arrived from the ISP network edge router 121, to one of the plural load balancing target apparatuses 111. In implementing the invention, a packet which arrived from the user network 130 may be relayed to one of the plural load balancing target apparatuses 111 or one of the virtual lines connected to V-BAS 101. V-LB 102 relays a packet addressed to the ISP network 120 or the Internet 140 received from one of the plural load balancing target apparatuses 111 or one of the virtual lines connected to V-BAS 101, to the ISP network edge router 121. Since V-BAS 101 and V-LB 102 each function as special routers, an IP address is assigned to the circuit interface of each as with an ordinary router or BAS. This is true not only for the circuit interface to which the ISP network edge router 121 is connected, but also the circuit interface to which the user network 130 and load balancing target apparatus 111 are connected, as well as the interface of the virtual line which interconnects V-BAS 101 and V-LB 102.

Concerning the circuit interface in which a layer 2 session with the user network 130 is provided, one IP address is generally assigned to the V-BAS side for plural layer 2 sessions, but the invention may be applied not only to this case but also when this is not true, such as when one IP address is assigned to the V-BAS side for one layer 2 session. In V-BAS 101 of this aspect, one IP address is assigned for plural layer 2 sessions to which the user network side is connected.

Also, as in the case of an ordinary router, V-BAS 101 or V-LB 102 of the present invention may also contain a circuit interface (un-numbered interface) to which an IP address is not assigned even though packet forwarding is performed. In this case, the invention may be applied if a layer 2 address or circuit interface identifier is used instead of a next hop IP address to display the packet forwarding destination. In this aspect, it will be assumed that both V-BAS 101 and V-LB 102 do not have an un-numbered interface.

In this aspect, respectively different IP addresses are assigned to the V-BAS 101 side circuit interface and V-LB 102 side circuit interface of the load balancing target apparatus 111. When a packet is delivered to one of the circuit interfaces, the load balancing target apparatus 111 performs appropriate processing, such as processing which the apparatus usually performs such as a firewall, for example, and this packet is then relayed to the other circuit interface by layer 3 (IP layer). V-BAS 101 and VLB 102 identify plural load balancing target apparatuses 111 by the IP address assigned to these apparatuses. When a packet is forwarded from V-BAS 101 to the load balancing target apparatus 111, it is forwarded assuming that the IP address assigned to the V-BAS 101 side circuit interface of this load balancing target apparatus 111 is the next hop IP address of the load balancing relay destination. The same is true of V-LB 102. In this aspect, the IP address is used to uniquely display the load balancing relay destination, so plural load balancing target apparatuses 111 may be connected to one circuit interface of V-BAS 101 or V-LB 102.

Even in the case of an apparatus wherein the load balancing target apparatus 111 relays a packet by layer 2, as in the case of for example a transmission type firewall, load balancing relay can be performed using the BAS/load balancer 100 of this aspect. However, in this case, to display the load balancing relay destination uniquely, V-BAS 101 uses the IP address assigned to the circuit interface of V-LB 102, and V-LB 102 uses the IP address assigned to the circuit interface of V-BAS 101. Alternatively, a circuit interface identifier is used instead of a next hop IP address. When the load balancing target apparatus 111 performs a layer 2 relay, in whatever method is used to uniquely determine the load balancing target apparatus 111 of the relay destination, one load balancing target apparatus can be connected to one circuit interface of V-BAS 101 or V-LB 102.

In the aforesaid network architecture, the V-BAS/load balancer 100 performs the following operations characteristic of the invention. The BAS/load balancer 100 has a load balancing forwarding table 234. Entries in this load balancing forwarding table 234 are created by V-BAS 101 when processing is performed to establish a network connection with the home router 132 or user host 133 of the user network 130. When processing is performed to establish a network connection, V-BAS 101 determines the load balancing target apparatus 111 that is the load balancing relay destination of the packet traveling between this user network 130 and the ISP network 120 using an arbitrary load balancing algorithm. The IP address of the V-BAS 101 side circuit interface of this apparatus is taken to be the next hop IP address of the load balancing relay destination used by V-BAS 101. Likewise, the IP address of the V-LB 102 side circuit interface of this apparatus is taken to be the next hop IP address of the load balancing destination used by V-LB 102. By providing the load balancing forwarding table 234 in the BAS/load balancer 100 of the invention, a link between the IP address or layer 2 session identifier assigned to the user host and the load balancing target apparatus 111 of the relay destination can be created.

Thus, the layer 2 session identifier used for connection between the user network 130 and V-BAS 101, the next hop IP address on the V-BAS 101 side, the IP address assigned to the user network 130 and the next hop IP address on the V-LB 102 side are added to the load balancing forwarding table 234. Of these four items, instead of the layer 2 session identifier used for connection between the user network 130 and V-BAS 101, the IP address assigned to the user network 130 may also be used. Moreover, instead of the IP address assigned to the user network 130, an IP address prefix showing the IP address space assigned to the user network 130 may also be used. By using the IP address (or IP address prefix) instead of the layer 2 session, the invention may be applied to a network architecture where dynamic assignment of the IP address (or IP address prefix) is performed instead of setting up a separate layer 2 session with the home router 132 or user host 133.

When a packet is received from the user network 130 side, V-BAS 101 looks up entries in the load balancing forwarding table 234 which match the received layer 2 session or which match the IP address of the packet sender. The packet is then relayed to the V-BAS 101 side next hop IP address of the matching entry. When a packet is received from the ISP network 120, the V-LB 102 looks up an entry in the load balancing forwarding table 234 which matches the destination IP address of the packet. The packet is then relayed to the V-LB 102 side next hop IP address of the matching entry. Since V-BAS 101 and V-LB 102 forward packets using the same load balancing forwarding table 234, outgoing and incoming communication traffic can be relayed to the same load balancing target apparatus 111 even if an arbitrary load balancing algorithm is used.

V-BAS 101 performs deletion of entries from the load balancing forwarding table 234 when a network connection with the home router 132 or user host 133 of the user network 130 is broken. When a network disconnection process is performed or when a network disconnection is detected, V-BAS 101 deletes the entry in the load balancing forwarding table 234 for which the layer 2 session identifier or IP address or IP address prefix assigned to the user network 130 used for connection between the user network 130 and V-BAS 101, matched. By deleting the entry corresponding to the user who disconnected from the network from the load balancing forwarding table 234, the number of entries is kept to a minimum, and increased memory usage and drop in packet forwarding speed can be prevented.

Figure 2:
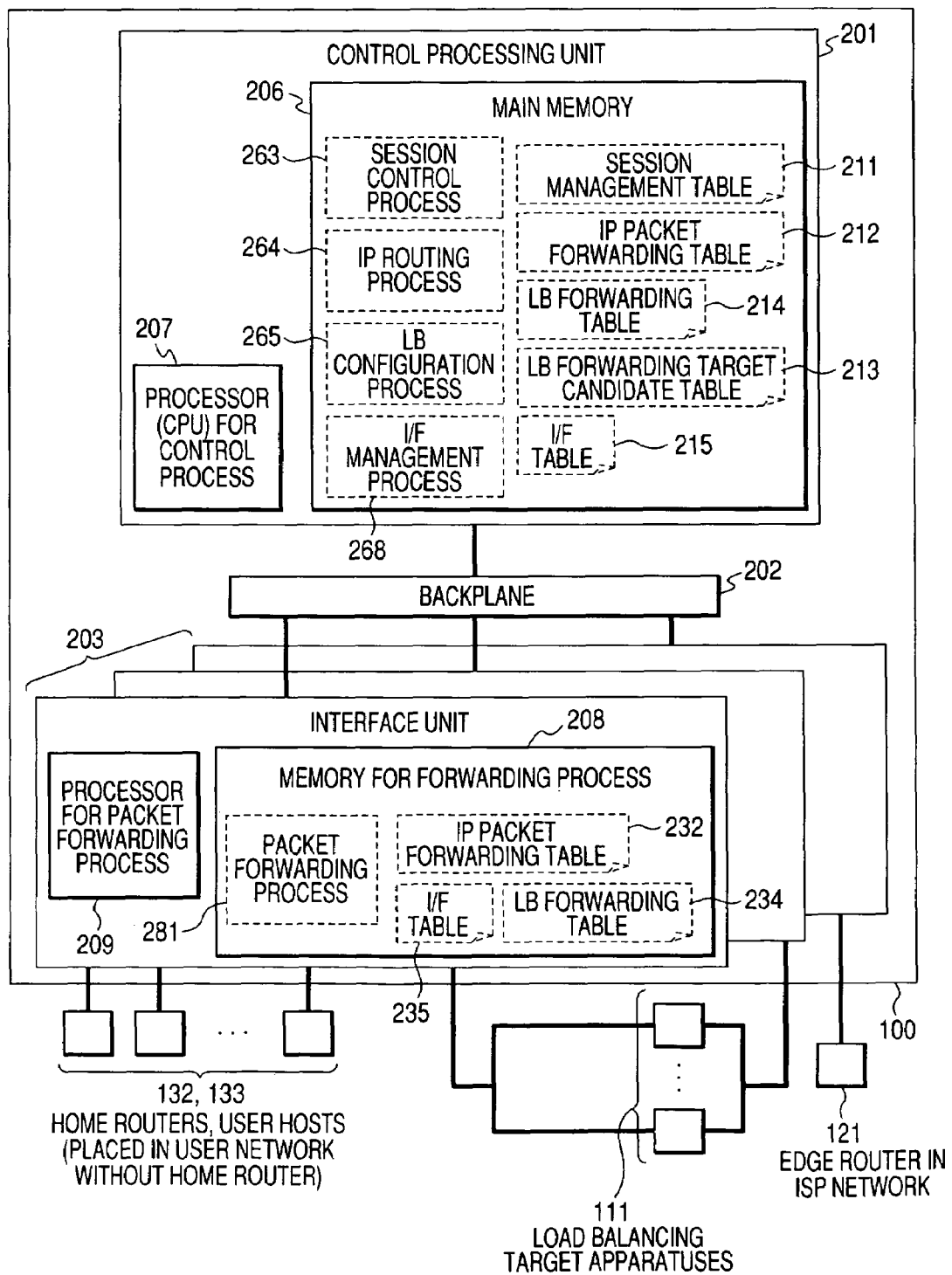
FIG. 2 is a diagram showing an internal processing architecture of the communication apparatus of the invention according to an aspect of the present invention.

FIG. 2 is a diagram showing the internal processing architecture of the communication apparatus according to an aspect of the present invention.

To implement the invention, the internal processing architecture of FIG. 2 is not necessary. The invention is sufficient if the load balancing relay destination of the user's communications traffic is determined both for the traffic leaving the user and the traffic addressed to the user.

According to an aspect of the present invention, the internal hardware of the BAS/load balancer 100 includes a control processor unit 201, backplane 202 and interface unit 203.

There are one or more interface units 203 in the BAS/load balancer 100. The interface unit 203 has a logical or physical circuit interface for connection to external communication apparatuses, such as home router 132, user host 133, load balancing target apparatus 111 and ISP network edge router 121, for example. These circuit interfaces belong to one of the VR in the BAS/load balancer 100 depending on the setting performed by the administrator of the BAS/load balancer 100.

When the circuit interface of the interface unit 203 receives an IP packet from an external communication apparatus, a packet forwarding process 281 operated by this interface unit 203 determines whether this packet is addressed to VR of this circuit interface. If it is addressed to the VR, the packet forwarding process 281 forwards this packet to the control process unit 201 via the backplane 202.

If the packet is not addressed to the VR, the packet forwarding process 281 determines the output circuit interface of this packet. If the output circuit interface does not belong to this interface unit 203, the packet forwarding process 281 forwards this packet to the interface unit 203 of the output circuit interface via the backplane 202. The packet forwarding process 281 operating in the interface unit 203 of the output circuit interface outputs this packet to the output circuit interface.

The packet forwarding process 281 performs the aforementioned processing when a packet forwarding processor 209 executes a program code stored in a packet forwarding process memory 208. The information used by the packet forwarding process 281 includes an IP packet forwarding table 232, load balancing forwarding table 234 and interface table 235 stored in the packet forwarding process memory 208.

In the interface table 235, information such as the corresponding VR or IP addresses assigned to the circuit interfaces is recorded. The interface table 235 is used by the packet forwarding process 281 to determine the VR of the circuit interface and to determine whether the received packet is addressed to the VR itself.

In the IP packet forwarding table 232, packet forwarding destination entries including the VR, destination IP address prefix and next hop IP address are recorded. The packet forwarding process 281 looks up the packet forwarding destination entry for which the destination IP address of the packet received from the circuit interface has the longest match, and which matches the corresponding VR, from the IP packet forwarding table 232. Process 281 then outputs the packet to the next hop IP address and output circuit interface stored in this entry.

The load balancing forwarding table 234 has four entries including a layer 2 session identifier used for connection between the user network 130 and V-BAS 101, the next hop address of the V-BAS 101, the IP address (or IP address prefix) assigned to the user network 130 and next hop address of the V-LB 102 (or three entries excluding the layer 2 session identifier). When V-BAS 101 receives a packet from the user network 130, the packet forwarding process 281 looks up an entry for which the layer 2 session that received the packet matches or for which the IP address of the sender's packet matches, from the load balancing forwarding table 234. When V-LB 102 receives a packet from the ISP network 120, the entry matching the destination IP address of the packet is looked up from the load balancing forwarding table 234. The packet forwarding process 281 outputs the packet to the next hop IP address and output circuit interface recorded in the entry. Although an arbitrary load balancing algorithm is used when V-BAS 101 and V-LB 102 transmit a packet using the same load balancing forwarding table 234, the outgoing and incoming communication traffic can be relayed to the same load balancing target apparatus.

The control process unit 201 has the function of correctly creating the IP packet forwarding table 232, load balancing forwarding table 234, and interface table 235 in the interface unit 203. For this purpose, an IP routing process 264, session control process 263, interface management process 268 and load balancing configuration process 265 are performed in the control process unit 201.

The IP routing process 264 performed in the control process unit 201, creates an IP packet forwarding table 212 in the control process unit 201 based on the result of an interface setting performed by the interface management process 268, static routing performed by the apparatus administrator and dynamic routing process using a routing protocol. All of the items and entries in this IP packet forwarding table 212, or the required items and entries, are reflected in the IP packet forwarding table 232 in the interface unit 203.

The session control process 263 performed in the control process unit 201 receives a network connection demand from the home router 132 or user host 133, and if required, performs a user authentication process. If approved, a network connection setup process is performed for the user. A session management table 211 is then created in the control process unit 201 based on the result of this network connection setup process.

The interface management process 268 performed in the control process unit 201 creates an interface table 215 in the control process unit 201 based on settings such as the corresponding VR, IP address and net mask assigned by the apparatus administrator to each circuit interface, and hardware information as to whether the circuit interfaces are active. All of the items and entries of this interface table 215, or the required items and entries, are reflected in the interface table 235 in the interface unit 203.

The load balancing configuration process 265 performed in the control process unit 201 creates a load balancer forwarding target candidate table 213 based on the setting of load balancing forwarding target candidates performed by the apparatus administrator. This load balancing forwarding target candidate setting contains pairs of IP addresses assigned to the V-BAS 101 side circuit interface of each load balancing target apparatus, and IP addresses assigned to the V-LB 102 side circuit interface. The load balancing configuration process 265 creates entries in the load balancing forwarding table 214 in the control process unit 201 using the load balancing target candidate table 213 wherein both IP addresses are appropriately matched. Using the load balancing forwarding table, packet relay can thus be performed with the outgoing and incoming communications traffic passed to the same load balancing target apparatus.

When the session control process 263 performs a network connection setup process for a user, the load balancing configuration process 265 selects an entry from the load balancing target candidate table 213 using an arbitrary load balancing algorithm. The load balancing relay destination assigned to the user is determined, and an entry in the load balancing forwarding table 214 in the control process unit 201 is created. By creating an entry corresponding to the user for whom a network connection was established in the load balancing forwarding table 214 in the control process unit 201, the load balancing relay destination can be determined using various conditions such as the identifier, such as layer 2 session identifier and IP address, for example, assigned to the user when the network connection is established, authentication/license information acquired when the user authentication process is performed, and dynamic network status changes (how uniformly the traffic has been load-distributed) when the network connection is established.

When the session control process 263 performs a network disconnection process or disconnect is detected for a user, the entry corresponding to the user is deleted from the load balancing forwarding table 214 in the control process unit 201. By deleting the entry corresponding to the user for whom a network connection was broken from the load balancing forwarding table 214 in the control process unit 201, the number of entries is kept to a minimum, and as a result, increased memory usage and decreased packet forwarding rate can be prevented.

The load balancing configuration process 265 reflects all of the items and entries of this load balancing forwarding table 214, or the required items and entries, in the load balancing forwarding table 234 in the interface unit 203.

In implementing the invention, the setting of the apparatus administrator included in the aforesaid processing may be realized by any desired method. This setting is commonly performed via initialization data stored in the control process unit 201 or a user interface for apparatus settings with which the control process unit 201 is provided.

The IP routing process 264, session control process 263, interface management process 268 and load balancing configuration process 265 which were described above are performed when a processor 207 for a control process executes a program code stored by a main storage 206 in the control process unit 201. An IP packet forwarding table 212, session management table 211, interface table 215, load balancing target candidate table 213 and load balancing forwarding table 214 in the control process unit 201 are stored by the main storage 206 in the control process unit 201.

In the internal processing architecture described above, the features characteristic of the invention are the load balancing forwarding table 234 in the interface unit 203, the process unit related to the load balancing forwarding table 234 in the packet forwarding process 281, the load balancing configuration process 265 in the control process unit 201, the load balancing forwarding table 214 and the load balancing target candidate table 213. The internal architecture other than the above is identical, or at least similar to, that of a general router according to the prior art.

FIG. 3 is a diagram showing an IP packet forwarding table according to an aspect of the present invention. The use and composition of this table are identical to those of a general router that has a VR function.

The lines in the IP packet forwarding table 212 in the control process unit 201 are packet destination entries, and represent relationships between the destination IP address of the received IP packet, the next hop IP address of the packet destination and the output circuit interface.

The lines in the IP packet forwarding table 212 in the control process unit 201 include five items: the VR identifier 301, destination IP address prefix 302, route type 303, next hop IP address 304 and identifier 305 of the output interface or session. Of course, items other than these may be included. Conversely, some of these items may not be included in this table, but equivalent information may be obtained by referencing another table instead. For example, instead of the identifier 305 of the output interface or session in this table, the circuit interface in the same subnet as the next hop IP address 304 may be queried from the interface table 215, and the entry found taken as the output interface.

The VR identifier 301 expresses the VR to which the entry of each line of the IP packet forwarding table 212 belongs. According to an aspect of the present invention, in order to show whether the entry of the line is used by V-BAS or by V-LB, one of the VR identifiers is stored. When there are plural V-BAS and V-LB in the apparatus of the invention, one of the VR identifiers assigned thereto is stored to show the related V-BAS.

The destination IP address prefix 302 expresses the range of destination IP addresses to which the entries of each line are applied. This destination IP address prefix 302 is generally expressed by a mask length and the IP address having the effective bit length of that value, but another expression method, such as an IP address and mask bit, for example, may be used. When determining the destination of the received packet using the IP packet forwarding table 212, the entry matching VR and the VR identifier 301 to the circuit interface which received the packet belongs, and for which the destination IP address of the packet has the longest match with the destination IP address prefix 302, is used to determine the forwarding destination.

The "IP address prefix that has the longest match with a given IP address" refers to the IP address prefix matching the IP address which has the longest mask length, so, for example, the IP address prefix matching the IP address for which the leading bit of the number expressed by the mask length matches.

A route type 303 is an item that shows the origin where an entry was created. When the value of the IP address prefix of the subnet to which the interface of this VR belongs or the host which is directly connected to this interface and the destination IP address prefix 302 of an entry belonging to a given VR, match each other, the value of the route type 303 of the entry is "directly connected". The value of the route type 303 for a subnet not connected to the VR to which the entry belongs (connected via another apparatus or another VR) or for an entry where the host is the destination IP address prefix 302, is "not directly connected".

"Direct connection" entries are created at the same time an IP address is assigned to the circuit interface of the VR, or when an IP address is assigned to the user host housing the V-BAS. "No direct connection" entries are created based on static routing by the administrator of the VR, and dynamic routing by a routing protocol.

Of course, in an actual apparatus, both "direct connection" and "no direct connection" may be further subdivided. For example, "direct connection" may be divided into a directly connected path of a static circuit interface or a directly connected path of a dynamic interface, and. "no-direct connection" may be divided into a route due to static routing and a route due to dynamic routing.

A next hop IP address 304 is an item showing the host to which a packet should be relayed when the value of the route type 303 is "not directly connected". The BAS/load balancer 100 transmits a packet to the host of the IP address shown by the next hop IP address 304 via a layer 2 circuit. In the case of "direct connection", since it is possible to deliver the packet directly to the host shown by the destination IP address of the packet via a layer 2 circuit, the next hop IP address 304 is unnecessary.

The identifier of the circuit interface, which outputs the packet to the relay, is stored in the identifier 305 of the output interface or session. When a layer 2 session connects the user host, the session identifier is stored. The layer 2 session mentioned here means a layer 2 circuit provided independently for each user. When for example using PPPOA (PPP over ATM), for example, this is a VC (Virtual Channel), which is a virtual layer 2 circuit of an ATM.

The IP packet forwarding table 232 in the interface unit 203 is also basically identical to the IP packet forwarding table 212 in the control process unit 201. However, it is not necessary to include all the contents of the IP packet forwarding table 212. For example, the BAS/load balancer 100 includes plural interface units 203, and when there is only an interface belonging to V-BAS1 in one, the interface unit 203 may have only the part 232-A of the IP packet forwarding table 212 related to V-BAS1. In this way, the number of entries held by the IP packet forwarding table 232 in the interface unit 203 is kept at a minimum, and as a result, increased memory usage and decreased packet forwarding rate can be prevented.

Although an IPv4 address is used as an example of a specific value of the IP address in this specification including FIG. 3, an IPv6 address may of course also be used in the invention.

FIG. 4 is a diagram showing a session management table according to an aspect of the present invention. The use and composition of this table are identical to those of a general BAS with a VR function. Each line of the session management table 211 in the control process unit 201 is an entry showing a layer 2 session or an IP address, or IP address prefix, assigned to each user host.

The sequence of the session management table 211 in the control process unit 201 includes 4 items: a VR identifier 401, interface identifier 402, session identifier 403 and assigned IP address prefix 404.

Of course, items other than these may be included. Conversely, some of these items may not be included in the table, but equivalent information may be obtained by referencing another table instead.

The VR identifier 401 expresses the VR to which the entry of each line of the IP packet forwarding table 212 belongs according to an aspect of the present invention, the VR identifier of V-BAS is stored. When there are plural V-BAS in the apparatus of the invention, one of the VR identifiers assigned is stored to show the V-BAS to which it belongs.

The identifier of the static circuit interface to which a user host is connected is stored in the interface identifier 402. When a layer 2 session is provided for a user, the identifier of the static circuit interface to which the layer 2 session belongs is stored. The identifier of the layer 2 session provided for a user is stored in the session identifier 403. This item is not used when the layer 2 session is not provided per user, such as when plural users are connected through the same layer 2 circuit, for example. The IP address assigned to the user host or the IP address prefix assigned to the user network is stored in the assigned IP address prefix 404. In general, when an IPv4 address is used for the IP address system, a single IPv4 address is used, and when IPv6 is used, one of a single IPv6 address or an IPv6 address prefix is assigned to the user. The present invention applies in both cases.

FIG. 5 is a diagram showing an interface table according to an aspect of the present invention. The use and composition of this table are the same as those of a general router with a VR function. Each line of the interface table 215 in the control process unit 201 is an entry showing the matching between a circuit interface, and the VR, IP address and mask length assigned to the circuit interface.

The lines of the interface table 215 in the control process unit 201 include five items: a VR identifier 501, interface identifier 502, IP address 503 of an interface, net mask length 504 of an interface, and virtual line identifier 505. Of course, items other than these may be included. Conversely, some of these items may not be included in the table, but equivalent information may be obtained by referencing another table instead. The VR identifier 501 expresses the VR to which the entry of each line of the interface table 215 belongs. According to an aspect of the present invention, the VR identifier of V-BAS or V-LB is stored. When there are plural V-BAS and V-LB in the apparatus of the invention, to show the V-BAS or V-LB to which it belongs, one of the VR identifiers assigned respectively thereto is stored.

The interface identifier 502 expresses a static circuit interface corresponding to the entry of each line of the interface table 215. The IP address assigned to the circuit interface corresponding to the entry of each line is stored in the IP address 503 of the interface. The mask length of the subnet to which the circuit interface belongs is stored in the net mask length 504 of the interface.

The virtual line identifier 505 is an item for virtually providing a connection circuit between plural VR in the apparatus of the invention. It is considered that entries for which the same value is stored in the item of the virtual line identifier 505, are connected by a virtual line.

To implement the invention, circuit interfaces for connecting V-BAS and V-LB in the same apparatus are required, and any means may be used for doing this. Such means include the virtual line identifier 505and other means to connect VR in the same apparatus may be provided, or two circuit interfaces provided outside the apparatus may be connected by a physical circuit.

The interface table 235 in the interface unit 203 is similar to the interface table 215 in the control process unit 201. However, it is not necessary to include all the contents of the interface table 215. For example, the BAS/load balancer 100 includes plural interface units 203, and when there is only a circuit interface belonging to V-BAS1 in one of them, the interface unit 203 may have only the part 235-A of the interface table 215 related to V-BAS1.

FIG. 6 is a diagram showing a load balancing target candidate table according to an aspect of the present invention. Each line of the load balancing target candidate table 213 in the control process unit 201 is an entry showing matching between the IP address seen from V-BAS of each load balancing apparatus, and the IP address seen from V-LB. The entries also express load balancing target apparatus candidates matched to the next hop IP address obtained by referencing an IP packet forwarding table. Based on this candidate, V-BAS creates a load balancing forwarding table when a network connection to the user host is established. The value of each item in this table is set based on the setting of the load balancing target candidates performed by the apparatus administrator.

The lines of the load balancing target candidate table 213 in the control process unit 201 include six items: a VR identifier 601 on the V-BAS side, next hop IP address 602 on the V-BAS side, packet destination IP address 603 from V-BAS, VR identifier 604 on the V-LB side, next hop IP address 605 on the V-LB side, and packet destination IP address 606 from V-LB. Of course, items other than these may be included.

For the entry of each line, the VR identifier 601 on the V-BAS side expresses the V-BAS to the next hop IP address 602 on the V-BAS side, and the packet destination IP address 603 from V-BAS, can be applied.

According to an aspect of the present invention, the VR identifier of V-BAS is stored in this item. When there are plural V-BAS in the apparatus of the invention, to show the V-BAS to which it is applied, one of the VR identifiers assigned respectively thereto is stored.

The next hop IP address 602 on the V-BAS side shows the next hop IP address to which the entry can be applied. For packets received by this V-BAS, only entries for which the next hop IP address obtained by drawing the IP packet forwarding table matches the value of this item, are candidate entries for that packet. The next hop IP address that is the load balancing relay destination is stored in the packet destination IP address 603 from V-BAS.

For the entry of each line, the VR identifier 604 on the V-LB side expresses the V-LB to which the next hop IP address 605 on the V-LB side, and the packet destination IP address 606 from V-LB, can be applied.

According to an aspect of the present invention, the VR identifier of V-LB is stored in this item. When there are plural V-LB in the apparatus of the invention, to show the V-LB to which it is applied, one of the VR identifiers assigned respectively thereto is stored.

The next hop IP address 605 on the V-LB side shows the next hop IP address to which the entries can be applied. For packets received by this V-LB, only entries for which the next hop IP address obtained by drawing the IP packet forwarding table matches the value of this item, are candidate entries for that packet.

The next hop IP address used as the load balancing relay destination is stored in the packet destination IP address 606 from V-LB.

FIG. 7 is a diagram showing the load balancing forwarding table according to an aspect of the present invention.

Each line of the load balancing forwarding table 214 in the control process unit 201 is an entry corresponding with a temporary next hop IP address obtained by drawing an IP packet forwarding table for IP packets sent by or addressed to a given user, and the next hop IP address actually used as the load balancing relay destination. V-BAS creates this table based on the load balancing target candidate table 213 when a network connection to the user host is established. When a user network connection is established, by creating the load balancing forwarding table 214 in the control process unit 201, the load balancing relay destination can be determined based on various conditions such as the identifier assigned to the user when the network connection was established (layer 2 session identifier and IP address), authentication/license information acquired during the user authentication process, and the dynamic network status change when the network connection is established (how uniformly the traffic is load-distributed).

The lines of the load balancing forwarding table 214 in the control process unit 201 can be divided roughly into two parts: a load balancing forwarding table 701 for V-BAS, and a load balancing forwarding table 702 for V-LB. The lines of the load balancing forwarding table 701 for V-BAS include five items: a VR identifier 711 on the V-BAS side, a temporary next hop IP address 712 on the V-BAS side, an input session identifier 713 for packets from the user, a new next hop IP address 714 on the V-BAS side, and an output interface identifier 715 on the V-BAS side. The lines of the V-LB load balancing forwarding table 702 include five items: a VR identifier 721 on the V-LB side, a temporary next hop IP address 722 on the V-LB side, a destination IP address prefix 723 for packets addressed to the user, a new next hop IP address 724 on the V-LB side, and an output interface identifier 725 on the V-LB side. Of course, items other than these may be included.

For the entry of each line, the VR identifier 711 on the V-BAS side expresses the V-BAS to which the load balancing forwarding table 701 for V-BAS can be applied. According to an aspect of the present invention, the VR identifier of V-BAS is stored in this item. When there are plural V-BAS in the apparatus of the invention, to show the V-BAS to which it is applied, one of the VR identifiers assigned respectively thereto is stored.

The same value as the next hop IP address 602 on the V-BAS side in the load balancing target candidate table 213 is stored in the temporary next hop IP address 712 on the V-BAS side.

The identifier of a different layer 2 session for each user connected to the user host is stored in the input session identifier 713 of the packet from the user. If the V-BAS of the received IP packet matches the value of the VR identifier 711 on the V-BAS side, the next hop IP address obtained by drawing the IP packet forwarding table matches the value of the temporary next hop address 712 on the V-BAS side, and the layer 2 session which received the packet matches the value of the input session identifier 713 of the packet from the user, the load balancing relay destination of the packet is determined using this entry.

If a layer 2 session is not provided for each user host and only the dynamic assignment of IP address is performed, the sender's IP address prefix assigned to the user host may be used instead of the input session identifier 713 of the packet from the user. However, in this case, care must be exercised regarding incorrect naming of the sender's IP address of the IP packet.

The next hop IP address, the load balancing relay destination, is stored in a new next hop IP address 714 on the V-BAS side.

The identifier of the circuit interface that outputs the packet during load balancing relay is stored in an output interface identifier 715 on the V-BAS side. The output interface may be deduced from the new next hop IP address 714 on the V-BAS side and the interface table without providing this item in the load balancing forwarding table.

If an entry for which a VR identifier, temporary next hop IP address and input session identifier match, is discovered in the V-BAS load balancing forwarding table 701, then V-BAS which received the IP packet changes the packet next hop and output interface using the new next hop IP address 714 on the V-BAS side and the value of the output interface identifier 715 on the V-BAS side for this entry.

For the entry of each line, the VR identifier 721 on the V-LB side expresses the V-LB to which the V-LB load balancing forwarding table 702 can be applied. According to an aspect of the present invention, the VR identifier of V-LB is stored in this item. When there are plural V-LB in the apparatus of the invention, to show the V-LB to which it is applied, one of the VR identifiers assigned respectively thereto is stored.

The same value as the next hop IP address 605 on the V-LB side in the load balancing target candidate table 213 is stored in a temporary next hop IP address 722 on the V-LB side. The IP address prefix, or single IP address, assigned to the user host is stored in a destination IP address prefix 723 of the packet addressed to the user. If the V-LB which received the IP packet matches the value of the VR identifier 721 on the V-LB side, the next hop IP address obtained by drawing the IP packet forwarding table matches the value of the temporary next hop address 722 on the V-LB side, and the destination IP address of the packet matches the value of the destination IP address prefix 723 of the packet addressed to the user, the load balancing relay destination of the packet is determined using the entry.

The next hop IP address which is the load balancing relay destination is stored in the new next hop IP address 724 on the V-LB side.

The identifier of the circuit interface that outputs a packet when the load balancing relay is performed, is stored in the output interface identifier 725 on the V-LB side. The output interface may be deduced from the new next hop IP address 724 and the interface table on the V-LB side without providing this item in the load balancing forwarding table.

If an entry for which a VR identifier, temporary next hop IP address and input session identifier match, is discovered in the V-LB load balancing forwarding table 702, then V-LB which received the IP packet changes the packet next hop and output interface using the new next hop IP address 724 on the V-LB side and the value of the output interface identifier 725 on the V-LB side for this entry.

The load balancing table 234 in the interface unit 203 is similar to the load balancing forwarding table 214 in the control process unit 201. However, it is not necessary to include all the contents of the load balancing forwarding table 214. For example, the BAS/load balancer 100 includes plural interface units 203, and when there is only an interface belonging to V-BAS1 in one of them, the interface unit 203 may have only the part of the V-BAS load balancing forwarding table 701 related to V-BAS1.

Figure 8:
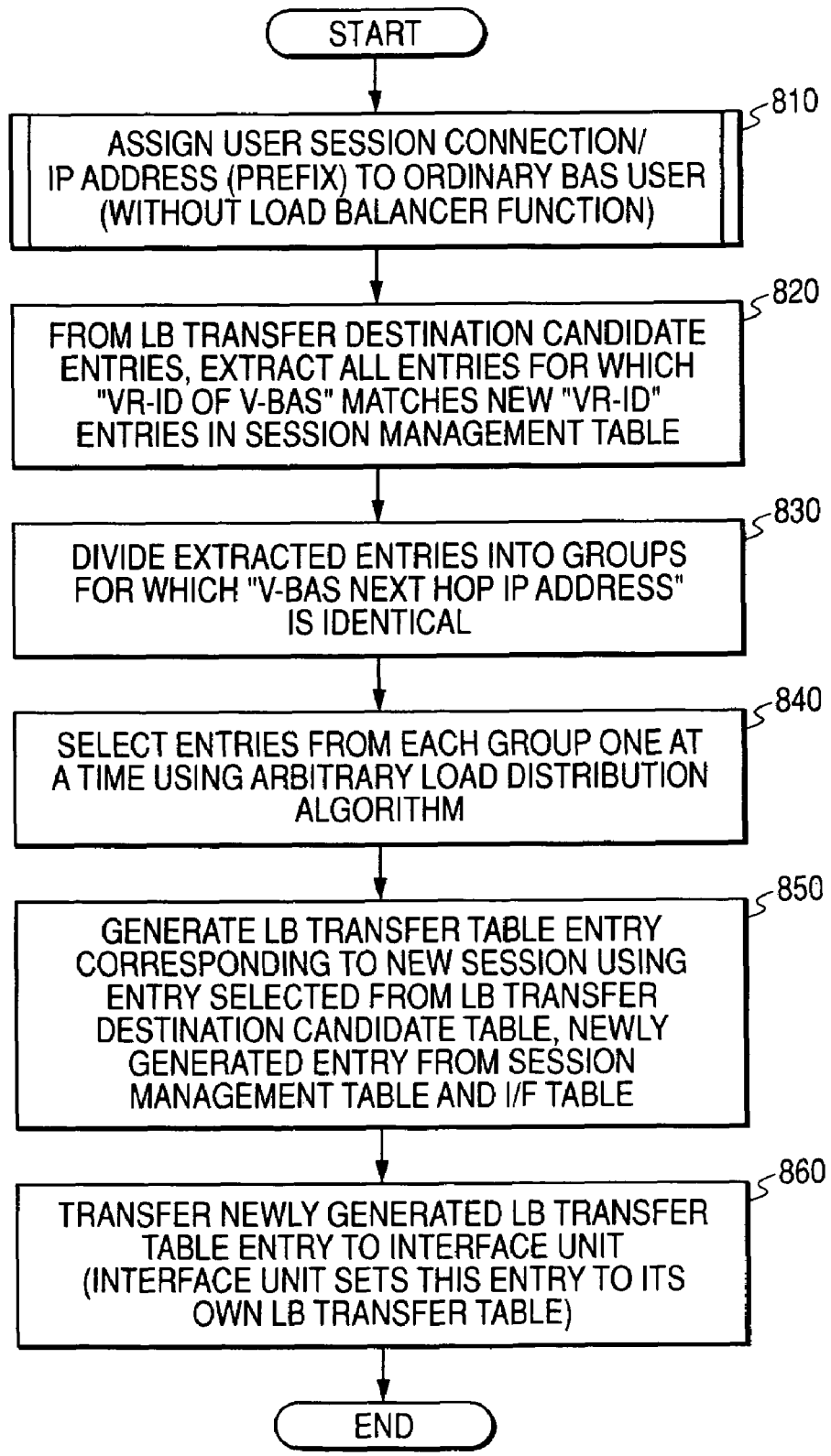
FIG. 8 is a diagram showing an entry creation processing flow of the load balancing forwarding table according to an aspect of the present invention.

FIG. 8 is a diagram showing the entry creation process flow of the load balancing forwarding table according to an aspect of the present invention. When a network connection demand from a home router 132 or user host 133 is received (step 810), the control process unit 201 of the apparatus of the invention performs the same network connection setup process as an ordinary BAS. This processing is performed by the session control process 263 that operates in the control process unit 201. Due to this processing, information such as the user's layer 2 session and assigned IP address when a network connection is established, is additionally registered as a new entry in the session management table 211.

The control process unit 201, after completing the network connection setup process of the step 810, performs a step 820 to a step 860 sequentially. This processing is performed by the load balancing configuration process 265 that operates in the control process unit 201.

In step 820, the load balancing configuration process 265 compares the value of a VR identifier (value of VR identifier 401 of session management table 211) corresponding to the user session when a network connection setup process was newly performed in the step 810, with the VR identifier 601 of the V-BAS of the entries in the load balancing target candidate table 213, and matching entries are extracted.

In the step 830, matching entries are divided into two groups for which the value of the next hop IP address 602 on the V-BAS side is the same.

In the step 840, one entry at a time is selected using an arbitrary load balancing algorithm from each group divided in the step 830. The load balancing algorithm used here may be any algorithm. Specifically, an algorithm, such as hash which gives a unique result even if an autonomous calculation is performed may be used, or an algorithm which does not necessarily give a unique result, such as round robin, number of assigned users, or apparatus load may be used. Hence, in the invention, the same process in the same apparatus determines the load balancing relay destination of the user traffic in both the outgoing and incoming directions immediately after a network connection to a user has been established, so there are no restrictions on the load balancing algorithm used.

In the step 850, some items included in the process entries of the session management table 211 are added to selected entries, and additionally registered as new entries in the load balancing forwarding table 214 in the control process unit 201. Of these new entries, among the 6 items, VR identifier 711 on the V-BAS side, temporary next hop IP address 712 on the V-BAS side, new next hop IP address 714 on the V-BAS side, VR identifier 721 on the V-LB side and temporary next hop IP address 722 on the V-LB side and new next hop IP address 724 on the V-LB side, the values of the entries selected in the step 840 (VR identifier 601 on the V-BAS side, next hop IP address 602 on the V-BAS side, packet destination IP address 603 from V-BAS, VR identifier 604 on the V-LB side, next hop IP address 605 on the V-LB side, and packet destination IP address 606 from V-LB) may be used as they are. Among the remaining items of the new entries, the value of the session identifier 403 of the entry in the session management table 211 goes into the input session identifier 713 of the packet from the user. The value of the assigned IP address prefix 404 of the session management table 211 goes into the destination IP address prefix 723 of the packet addressed to the user. As for the output interface identifier 715 on the V-BAS side and output interface identifier 725 on the V-LB side, the output interface for sending out a packet to the new next hop IP address 714 on the V-BAS side and new next hop IP address 724 on the V-LB side is determined using the interface table 215 in the control process unit 201. The interface identifiers are respectively registered in each item.

In the step 860, the entry that was newly registered in the step 850 is sent to the interface unit 203 from the load balancing configuration process 265 of the control process unit 201. The interface unit 203 that receives this performs additional registration of the received entry in its own load balancing forwarding table 234.

Figure 9:
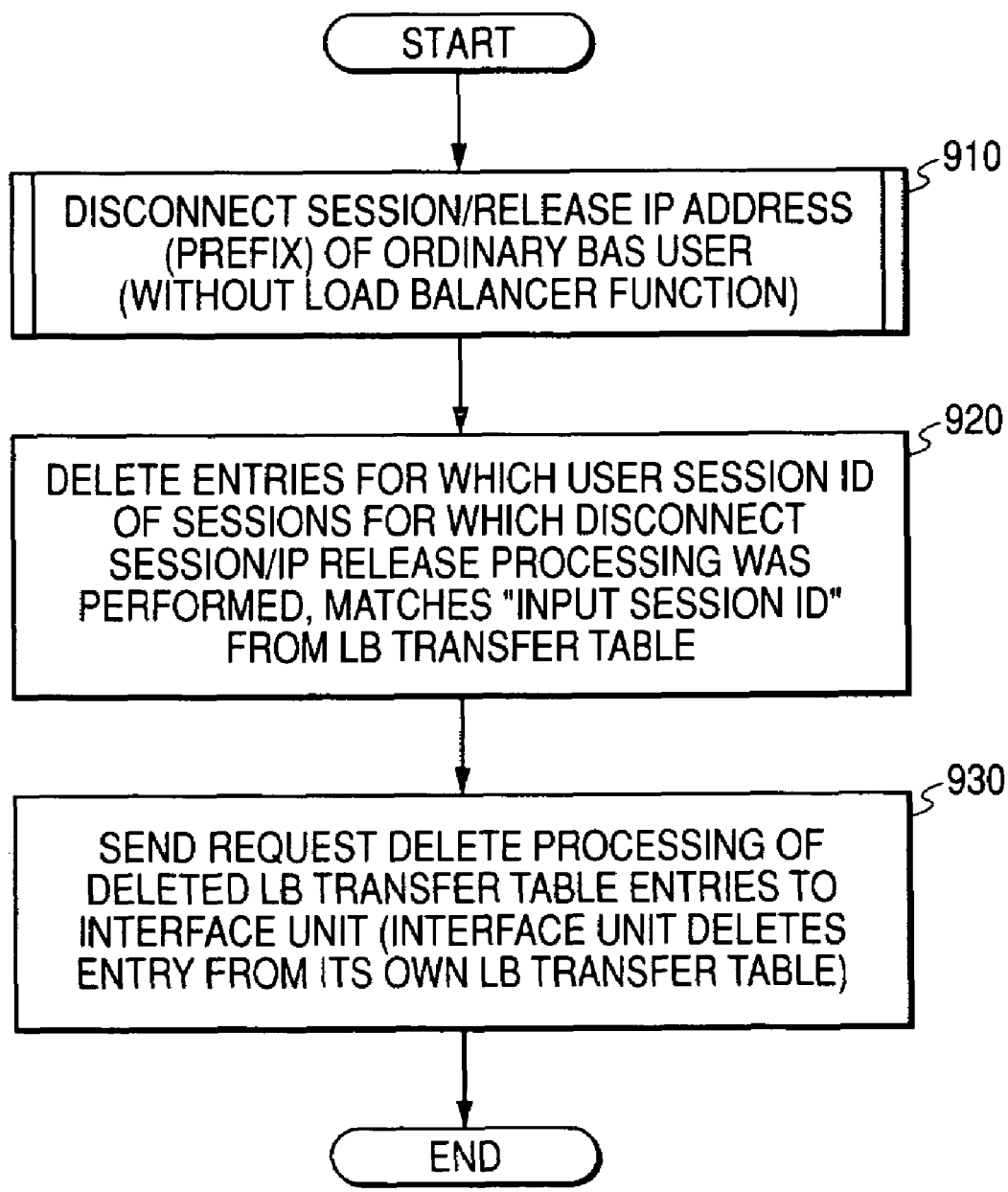
FIG. 9 is a diagram showing an entry delete processing flow of the load balancer forwarding table according to an aspect of the present invention.

FIG. 9 is a diagram showing the entry delete process flow of the load balancing forwarding table according to an aspect of the present invention.

When the control process unit 201 of the apparatus of the invention receives a user's network disconnection request from the home router 132 or user host 133, or when a network disconnection from the home router 132 or user host 133 is detected, the same network disconnection process as an ordinary BAS is performed (step 910). This processing is performed by the session control process 263 that operates in the control process unit 201. Due to this processing, the entry corresponding to the user for whom the network disconnection process was performed, is deleted from the session management table 211. At this time, the value of the session identifier 403 of the deleted entry is stored, and used in the following step 920.

After the network disconnection process of the step 910 is performed, the control process unit 201 performs processing from step 920 to a step 930 sequentially. This processing is performed by the load balancing configuration process 265 that operates in the control process unit 201.

In the step 920, the load balancing configuration process 265 of the control process unit 201 looks up the entries for which the value of the input session identifier 713 of the packet from the user, matches the session identifier 403 of the entry deleted from the session management table 211, from the load balancing forwarding table 214 in the control process unit 201, and all entries found are deleted. If there are plural V-BAS in the apparatus of the invention, and the value of the input session identifier 713 of the packet from a user may be the same for different V-BAS, it is necessary to verify that the value of the VR identifier 401 of the session management table 211 and VR identifier 711 of V-BAS of the load balancing forwarding table 214 match.

In a step 930, information showing the entry deleted in the step 920 is sent to the interface unit 203 from the load balancing configuration process 265 of the control process unit 201. The interface unit 203 that receives this deletes all entries corresponding to the received information from its own load balancing forwarding table 234. By performing the entry delete process of the load balancing forwarding table according to this flow, entries corresponding to users for whom a network connection was broken can be deleted from the load balancing forwarding tables 214, 234 in both the process unit 201 and interface unit 203. Thereby, the number of entries in the load balancing forwarding table is kept to the minimum, and as a result, increased memory usage and decreased packet forwarding rate can be prevented.

Figure 10:
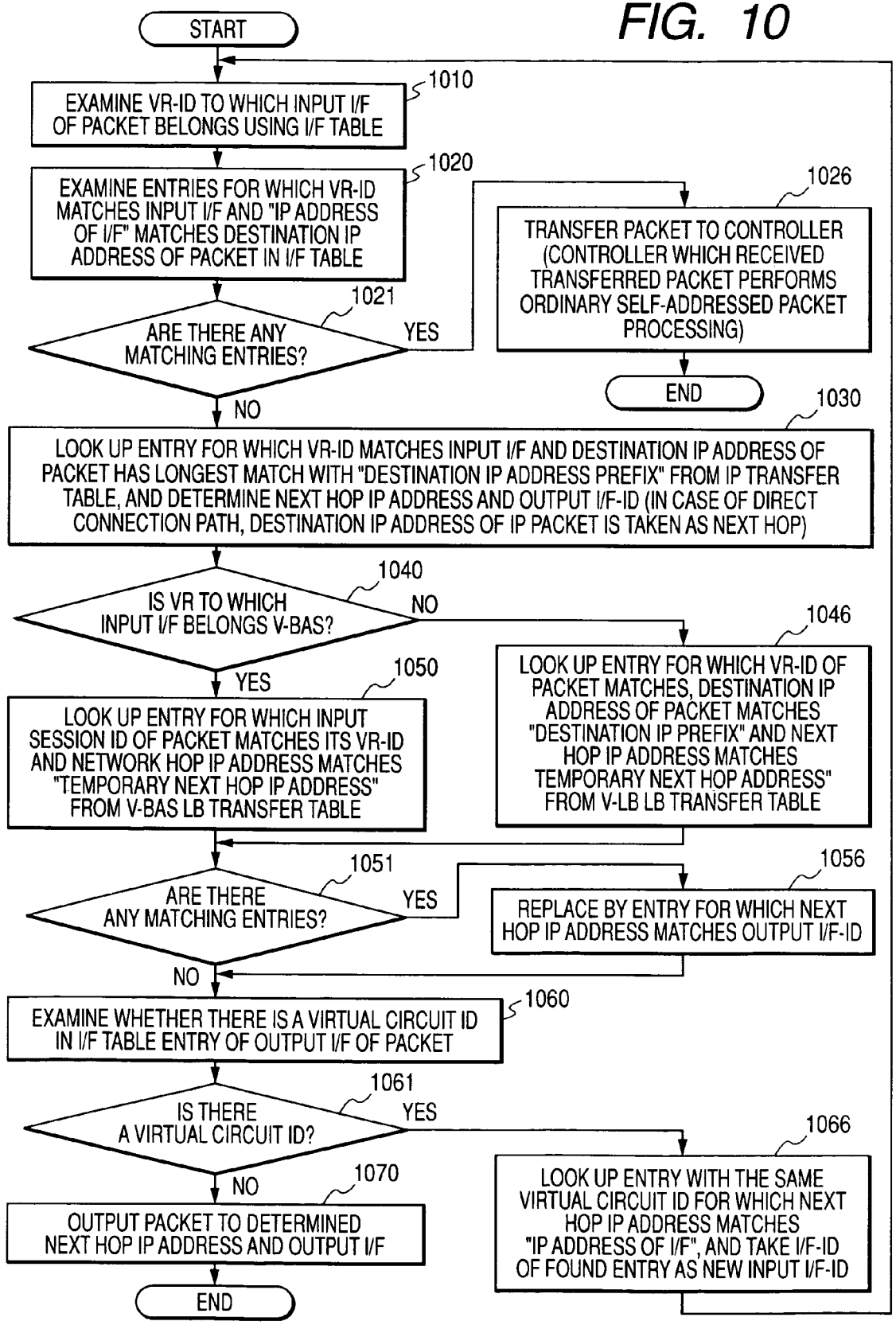
FIG. 10 is a diagram showing a packet forwarding processing flow of the communication apparatus according to an aspect of the present invention.

FIG. 10 is a diagram showing the packet forwarding processing flow of the communication apparatus according to an aspect of the present invention. This processing flow is performed by a packet forwarding process 281 that operates in the interface unit 203.

The processing flow of FIG. 10 may be broadly divided into six parts: determination of the VR to which the input interface belongs (step 1010), determination and processing of a self-addressed IP packet (from step 1020 to step 1026), determination of forwarding destination by the packet forwarding table (step 1030), change of forwarding destination by the load balancing forwarding table (from step 1040 to step 1056), virtual line processing (from step 1060 to step 1066), and output of the packet (step 1070). Among these, the processing from step 1010 to step 1030, and the step 1070, is similar to the packet forwarding processing performed by an ordinary router with a VR function. The processing from the step 1060 to the step 1066 is intended to realize the function of a virtual line The processing flow of FIG. 10 applies when the interface unit 203 with an input interface and interface unit 203 with an output interface are the same, such as when there is only one interface unit 203 in the apparatus of the invention, for example. When both of the interface units 203 are not the same, the interface unit 203 with an input interface performs the processing up to the step 1056, and the packet is transmitted to the interface unit 203 with an output interface via the back-plane 202. The step 1060 and subsequent steps are performed by the interface unit 203 with an output interface.

The packet forwarding process 281 in the interface unit 203 of the apparatus of the invention starts packet relay processing from a step 1010 when an IP packet is inputted from its own interface. In the step 1010, an entry for which the identifier of the input interface matches the value of the interface identifier 502 recalled from the interface table 235, and it is considered that the VR identifier 501 of the entry found is the VR to which the input interface belongs.

In the next step 1020, the entry for which the value of the VR identifier 501 matches the VR of the input interface found in the step 1010, and for which the value of the IP address 503 of the interface matches the destination IP address of the input packet, is recalled from the interface table 235. If there is a matching entry (step 1021), the input packet is considered to be self-addressed, the packet is sent to the control process unit 201 via the backplane 202 (step 1026), and packet relay processing is terminated. The control process unit 201 which received the forwarded self-addressed packet performs suitable processing, such as routing protocol processing, for example, according to the contents of the self-addressed packet similar to an ordinary router or BAS.

If a matching entry is not found in the step 1021, the routine proceeds to a step 1030.

In the step 1030, an entry for which the item value of the VR identifier 301 matches the VR of the input interface examined in the step 1010, and for which the destination IP address of the input packet is the longest match to the value of the destination IP address prefix 302, is recalled from the IP packet forwarding table 232. The value of the next hop IP address 304 of the matching entry is taken as a temporary next hop, and the value of the output interface or the identifier 305 of the session is taken as a temporary output interface. However, if the value of the route type 303 is a "direct connection", the destination IP address of the input packet is taken as a temporary next hop.

In a next step 1040, it is determined whether the VR of the input interface examined in the step 1010 is V-BAS or V-LB. As a result, if it is V-LB, the routine proceeds to a step 1046, and if it is V-BAS, the routine proceeds to a step 1050. Although this aspect does not show the detailed method of performing this determination, a table that registers all VR identifiers of V-BAS may be provided separately. For example, it may be determined beforehand that the VR identifier of V-BAS is an even number. Also, when VR is V-BAS or V-LB, the processing of both the step 1046 and step 1050 may be performed without performing the determination of the step 1040.

In the step 1046, an entry for which the value of the VR identifier 721 on the V-LB side matches the VR of the input interface examined in the step 1010, the value of the temporary next hop IP address 722 on the V-LB side matches the temporary next hop determined in the step 1030, and the destination IP address of the input packet matches the value of the destination IP address prefix 723 of the packet addressed to the user, is recalled from the VL-B load balancing forwarding table 702. The routine then proceeds to a step 1051.

In the step 1050, an entry for which the value of the VR identifier 711 on the V-BAS side matches the VR of the input interface examined in the step 1010, the value of the temporary next hop IP address 712 on the V-BAS side matches the temporary next hop determined in the step 1030, and the value of the input session identifier 713 of the packet from the user matches the layer 2 session of the input packet, is recalled from the V-BAS load balancing forwarding table 701. The routine then proceeds to the step 1051.

In the step 1051, if a matching entry in the step 1046 or step 1050 is found, the routine proceeds to a step 1056. If it is not found, the temporary next hop and temporary output interface determined in the step 1030 are treated as the next hop IP addresses and output interfaces of the subsequent steps, and the routine proceeds to a step 1060.

In the step 1056, the temporary next hop is replaced by the value of the new next hop IP address of the entry found (the next hop IP address 724 on the V-LB side when found in the step 1046, and the next hop IP address 714 on the V-BAS side when found in the step 1050), and treated as the next hop IP address of subsequent steps. Also, the temporary output interface is replaced by the output interface identifier of the entry (the output interface identifier 725 on the V-LB side when found in the step 1046, and output interface identifier 715 on the V-BAS side when found in the step 1050), and treated as the output interface of subsequent steps. Due to the processing from the step 1040 to the step 1056 described above, the next hop determined by the similar processing as that shown for an ordinary router up to the step 1030, can be replaced by the IP address of a suitable load balancing apparatus 111 using the load balancing forwarding table 234.

In a next step 1060, an entry for which the identifier of the output interface matches the value of the interface identifier 502, is recalled from the interface table 235, and examined to determine whether the value is stored in the virtual-circuit identifier 505 of the entry found. If the value is stored (step 1061), the routine proceeds to a step 1066, and if it is not stored, the routine proceeds to a step 1070.

In a step 1066, an entry which has the same virtual line identifier 505 as the value of the virtual line identifier 505 stored in the step 1060 and for which the next hop IP address of a packet matches the IP address 503 of an interface, is recalled from the interface table 235. The interface identifier 502 of the entry found is considered as an identifier of the new input interface of a packet, and packet forwarding processing is repeated from the beginning (from the step 1010).

In a step 1070, a packet is sent out from the determined output interface to the determined next hop IP address, and packet forwarding processing is terminated.

Figure 11:
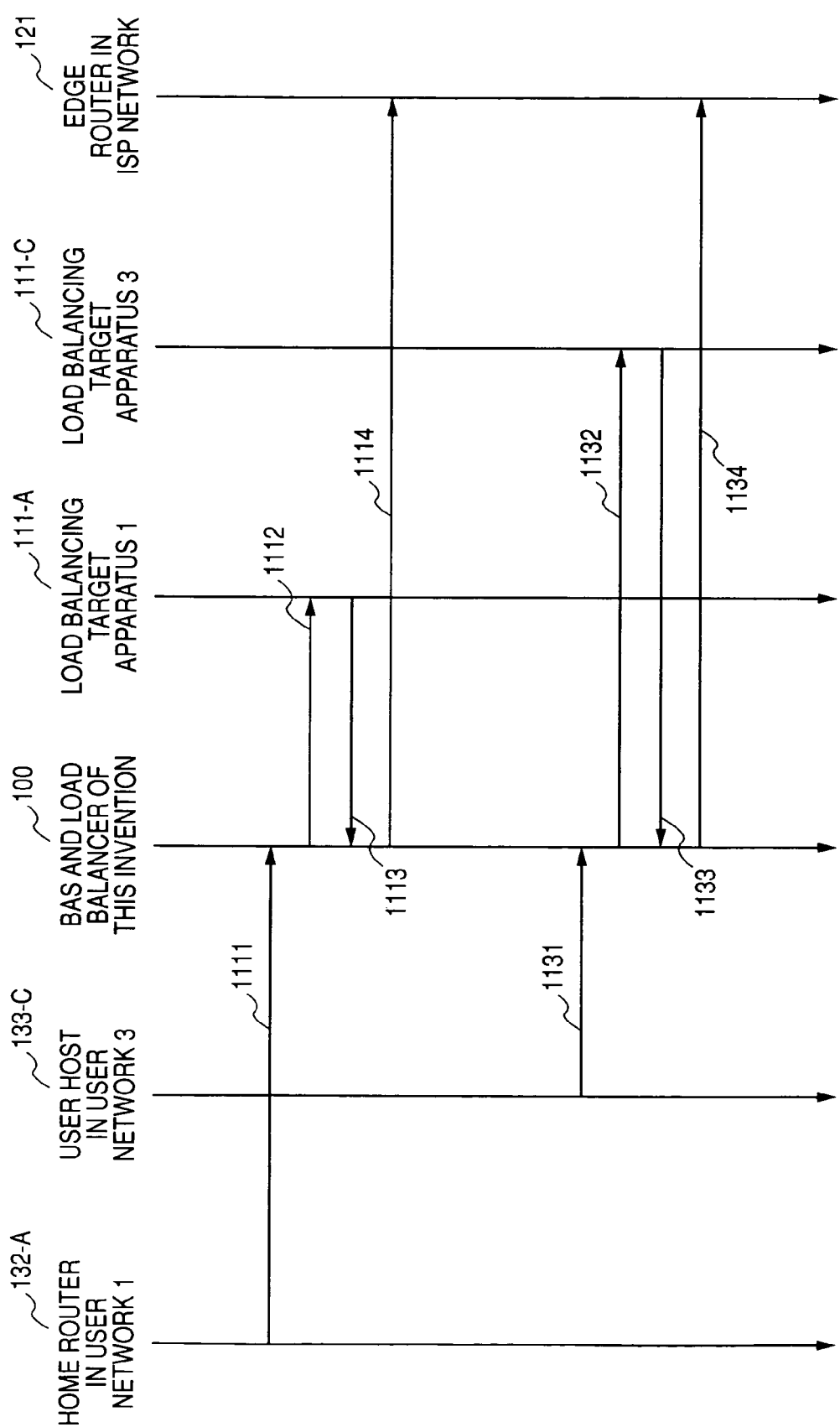
FIG. 11 is a diagram showing a send/receive sequence when the communication apparatus of the invention receives an IP packet addressed to a host in an ISP network or in a network beyond, and relays it to the ISP network according to an aspect of the present invention.

FIG. 11 is a diagram showing a send/receive sequence when the communication apparatus of the invention receives an IP packet addressed to a host in an ISP network or in a network beyond, and relays it to the ISP network according to an aspect of the present invention.

First, the BAS/load balancer 100 of the invention receives an IP packet from the home router 132 or user host 133 of the user network connected to V-BAS in the apparatus (steps 1111 and 1131). Here, the destination IP address of this packet is the IP address of a host in the ISP network connected to V-LB in the same apparatus as V-BAS, or in a network, such as the Internet, for example beyond that point.

V-BAS in the apparatus of the invention that received the packet determines the next hop IP address and output interface based on the packet forwarding processing flow from the user network. In this case, in packet forwarding processing, the next hop IP address and output interface which were previously determined using the IP packet forwarding table 232 are replaced using the V-BAS load balancing forwarding table 701. Therefore, the final next hop IP address is an IP address of one of the load balancing target apparatuses 111, and the output interface is a circuit interface connected with this apparatus. V-BAS in the apparatus of the invention relays a packet from the determined output interface to the determined next hop IP address (steps 1112 and 1132).

The load balancing target apparatus 111 that receives this packet performs processing which should be performed by this apparatus, and relays the packet to V-LB in the apparatus of the invention (steps 1113 and 1133).

V-LB in the apparatus of the invention that received the packet determines the next hop IP address and output interface based on the packet forwarding processing flow from the load balancing target apparatus 111. In this case, in packet forwarding processing, the next hop IP address and output interface which were determined using the IP packet forwarding table 232 are used, so the next hop IP address is the IP address of the ISP network edge router 121, and the output interface is a circuit interface connected to the apparatus. V-LB in the apparatus of the invention relays the packet from the determined output interface to the determined next hop IP address (steps 1114 and 1134). The relayed packet is further relayed by an ISP network edge router and a communication apparatus if needed, and arrives at its final destination host.

Figure 12:
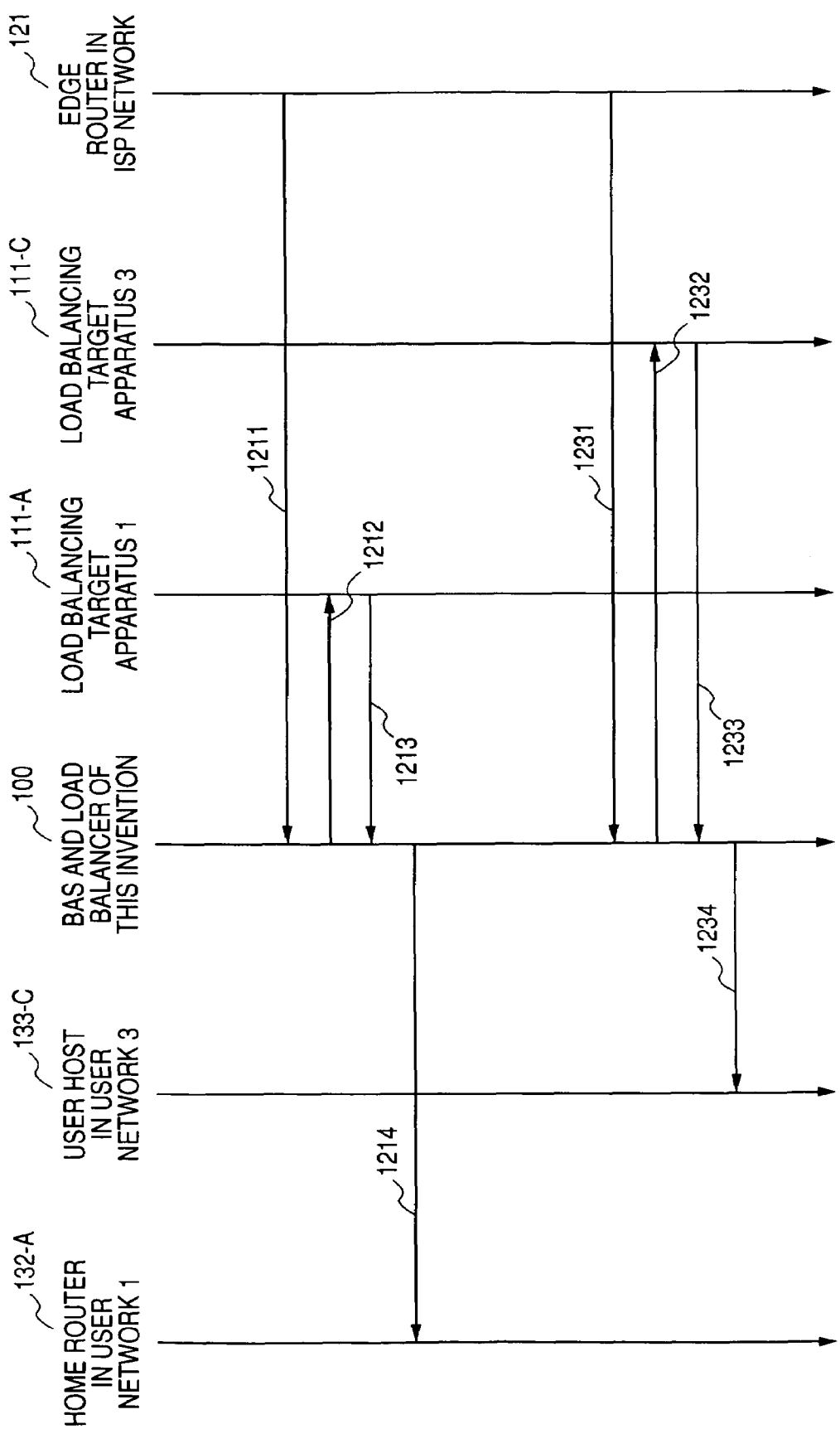
FIG. 12 is a diagram showing the send/receive sequence when the communication apparatus of the invention receives an IP packet addressed to a host in a user network from an ISP network, and relays it to the user network according to an aspect of the present invention.

FIG. 12 is a diagram showing the send/receive sequence when the communication apparatus of the invention receives an IP packet addressed to a host in the user network from an ISP network, and relays it to the user network according to an aspect of the present invention.

First, the BAS/load balancer 100 of the invention receives an IP packet from the ISP network edge router 121 connected to V-LB in the apparatus (steps 1211 and 1231). Here, the destination IP address of this packet is considered to be the IP address of the host in the user network connected to V-BAS in the same apparatus as V-LB. V-LB in the apparatus of the invention that received the packet determines the next hop IP address and output interface based on the packet forwarding processing flow from the ISP network.

In this case, in packet forwarding processing, the next hop IP address and output interface which were previously determined using the IP packet forwarding table 232 are replaced using a V-LB load balancing forwarding table 702. Therefore, the final next hop IP address is one of the IP addresses of the load balancing target apparatuses 111, and the output interface is a circuit interface connected to the apparatus. V-LB in the apparatus of the invention relays the packet from the determined output interface to the determined next hop IP address (steps 1212 and 1232).

The load balancing target apparatus 111 which received this packet performs processing should be performed by this apparatus, and the packet is relayed to V-BAS in the apparatus of the invention (steps 1213 and 1233).

V-BAS in the apparatus of the invention that received the packet determines the next hop IP address and output interface based on the packet forwarding processing flow from the load balancing target apparatus 111. In this case, in packet forwarding processing, the next hop IP address and output interface which were determined using the IP packet forwarding table 232 are used. Therefore, the next hop IP address is the IP address of the home router 132 of the user network or user host 133 which is the destination, and the output interface is the layer 2 session connected to the apparatus. V-BAS in the apparatus of the invention relays the packet from the determined output interface to the determined next hop IP address (steps 1214 and 1234). If necessary, the relayed packet is further relayed by the home router 132 of the user network and the communication apparatus beyond, and arrives at the final destination host.

As discussed above, an entry corresponding to a user for whom a network connection was established with V-BAS 101 is created in the load balancing forwarding table 234. Using this, load balancing relay of the two-way traffic from V-LB 102 to V-BAS 101 and from V-BAS 101 to V-LB 102 is performed. Due to this, the forward/return traffic of a user who makes a network connection can be dynamically relayed to the same load balancing target apparatus 111, and an arbitrary algorithm can also be used for the load balancing algorithm.

In addition to V-BAS 101 and V-LB 102 being provided in the same apparatus, when V-BAS 101 relays traffic to the load balancing target apparatus 111, the layer 2 session identifier which received the traffic is used to determine the relay destination. Therefore, compared with the case where the BAS and load balancing are provided separately, the invention is not only advantageous in respect of the cost of the apparatus itself, or apparatus-management cost, but quality packet forwarding performance can be achieved. Moreover, a special function in the load balancing apparatus like an autonomous load balancing function is not required.

Figure 13:
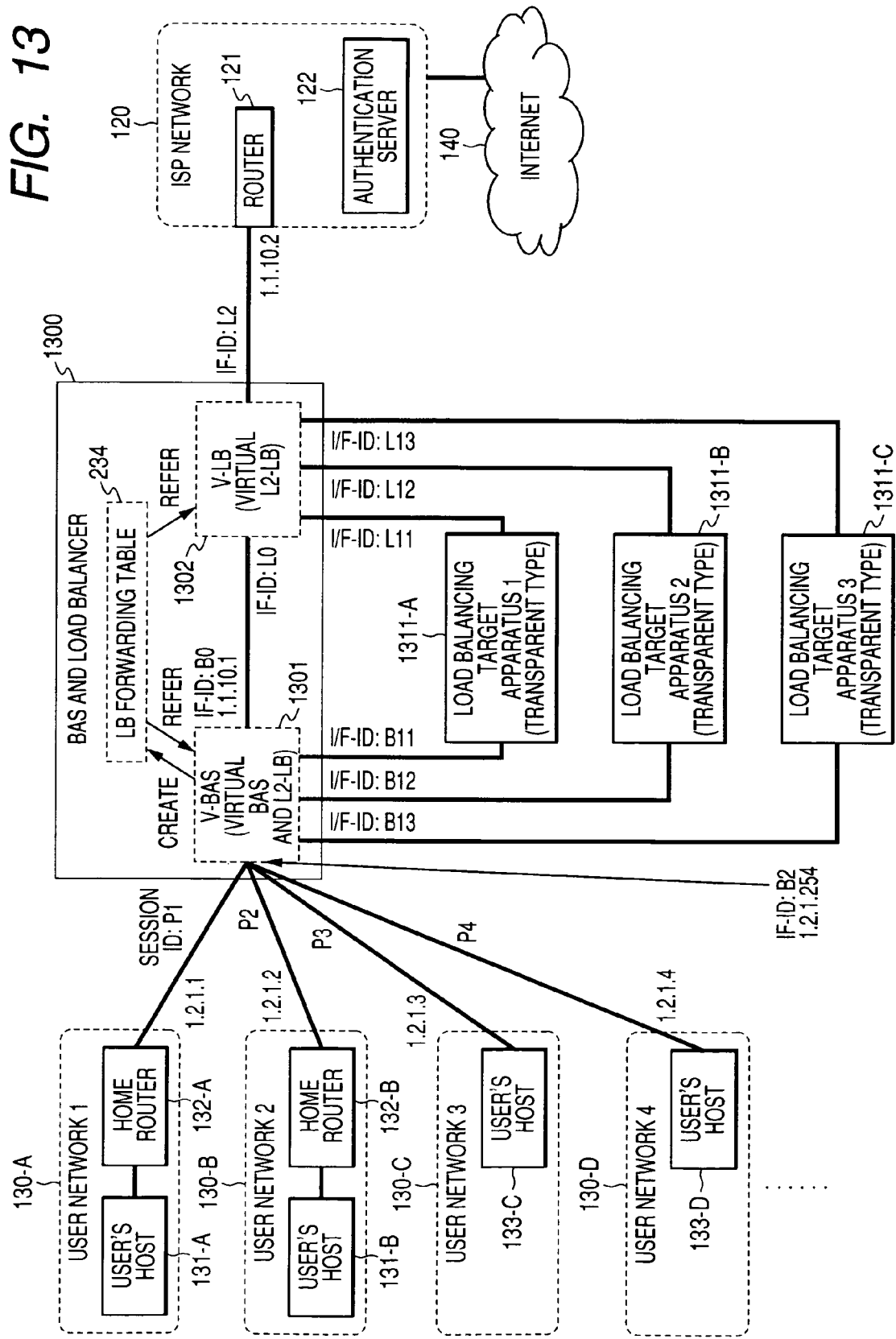
FIG. 13 is a diagram showing the network configuration and the virtual internal configuration of the communication apparatus according to an aspect of the present invention.

FIG. 13 is a diagram showing the network configuration and the virtual internal configuration of the communication apparatus according to an aspect of the present invention. A BAS/load balancer 1300 of the invention according to an aspect of the present invention may be identical to the BAS/load balancer 100 of the invention described hereinabove except for the load balancing relay processing by layer 2. There are two virtual apparatuses, V-BAS 1301 and V-LB 1302, in the apparatus 1300 of the invention. However, it differs from the previous description in that V-LB 1302 operates not as a router but as a layer 2 switch. Therefore, an IP address is not assigned by each interface, including the virtual-circuit interface connected with V-BAS 1301, of V-LB 1302.

V-BAS 1301 operates as a router as described hereinabove. However, all the interfaces connected to a load balancing target apparatus and the virtual line interfaces connected to V-LB 1302 are collectively treated as one interface from the viewpoint of layer 3. In other words, only one IP address is assigned to all these interfaces. This can also be interpreted as V-BAS 1301 including a combination of a pure router and a layer 2 load balancing switch connected to one of the interfaces. A load balancing target apparatus 1311 is an apparatus that relays a packet by layer 2, for example a transmission type firewall. For the load balancing target apparatus 1311, V-BAS 1301 and the load balancing target apparatus 1311 are connected by independent physical or logical circuits. The same is true of V-LB 1302 and the load balancing target apparatus 1311.

FIG. 14 is a diagram showing the IP packet forwarding table according to an aspect of the present invention.

The use and composition of this table are similar to that of the IP packet forwarding table discussed hereinabove. According to an aspect of the present invention, the only difference is that V-LB operates not as a router but as a layer 2 switch, so V-LB does not use this table and there is no entry in which the VR identifier 301 is V-LB.

FIG. 15 is a diagram showing the interface table according to an aspect of the present invention. The use of this table is similar to that described above. However, since the circuit interface which is the destination of the load balancing relay is specified, a load balancing source interface identifier 1506 is newly provided.

In V-BAS, the IP address 503 of the interface and the net mask length 504 of the interface are set to only one of the entries for which the load balancing source interface identifier 1506 is empty, or the value of the load balancing source interface identifier 1506 and interface identifier 502 are equal. Entries for which the load balancing source interface identifier 1506 is not empty, and the values of the load balancing source interface identifier 1506 and interface identifier 502 are different, are treated from the viewpoint of layer 3 as the same circuit interface as that shown by the value of the load balancing source interface identifier 1506.

In V-LB, the values of the IP address 503 of an interface and the value of the net mask length 504 of an interface are not set to any circuit interface. Entries for which the load balancing source interface identifier 1506 is not empty, and the values of the load balancing source interface identifier 1506 and interface identifier 502 are different, are treated from the viewpoint of an ordinary layer 2 switch as the same circuit interface as the circuit interface shown by the value of the load balancing source interface identifier 1506. Specifically, when V-LB performs flooding relay of packets which the load balancing source interface identifier 1506 received from a circuit interface which is not empty, the value of the load balancing source interface identifier 1506 is not output to the same circuit interface as the circuit interface. Also, when V-LB performs flooding relay of packets received from a given circuit interface, if there are plural equal circuit interfaces for which the value of the load balancing source interface identifier 1506 is not empty, one is selected and outputted, and is not outputted to another circuit interface for which the load balancing source interface identifier 1506 is equal.

The value of the load balancing source interface identifier 1506 is simultaneously set when the apparatus administrator sets the load balancing target candidate table 213.

FIG. 16 is a diagram showing the load balancing target candidate table according to an aspect of the present invention. The use of this table is similar to that described hereinabove. However, the output interface identifier shows the load balancing relay destination instead of the next hop IP address. Since the apparatus of the invention performs load balancing relay by layer 2 and the load balancing target apparatus also acts as a relay by layer 2, the load balancing target apparatus cannot be shown uniquely by the next hop IP address.

Specifically, the next hop IP address 602 on the V-BAS side, packet destination IP address 603 from V-BAS, next hop IP address 605 on the V-LB side and packet destination IP address 606 from V-LB, are replaced by an interface identifier 1602 on the V-BAS side, output interface identifier 1603 from V-BAS, interface identifier 1605 on the V-LB side and output interface identifier 1606 from V-LB, respectively.

FIG. 17 is a diagram showing the load balancing forwarding table according to an aspect of the present invention. The use of this table is similar to that described above. However, instead of the next hop IP address, the output interface identifier shows the load balancing relay destination. The reason for this is the same as that for the load balancing target candidate table.

Specifically, the temporary next hop IP address 712 on the V-BAS side and temporary next hop IP address 722 on the V-LB side are replaced by a temporary output interface 1712 on the V-BAS side, and temporary output interface identifier 1722 on the V-LB side, respectively. Also, since the new next hop IP address 714 on the V-BAS side and new next hop IP address 724 on the V-LB side are not required with layer 2, they are not present in the load balancing forwarding table.

Figure 18:
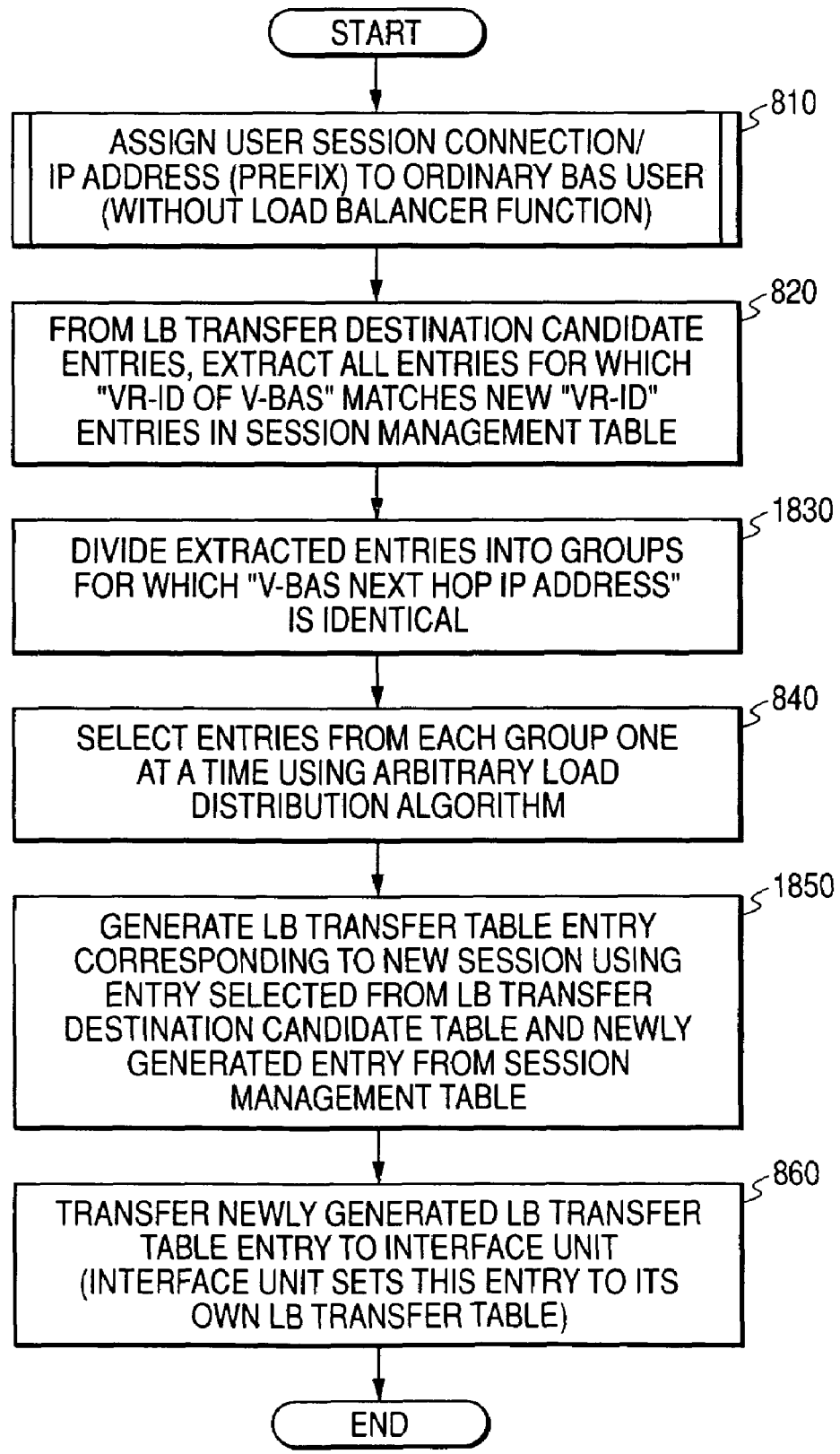
FIG. 18 is a diagram showing the entry creation processing flow of the load balancing forwarding table according to an aspect of the present invention.

FIG. 18 is a diagram showing the entry creation processing flow of the load balancing forwarding table according to an aspect of the present invention. The contents of this processing are similar to that of the entry creation processing flow of the load balancing forwarding table described above. Although the next hop IP address 602 on the V-BAS side was used in the step 830 as described above, an interface identifier 1602 on the V-BAS side is used instead in a step 1830. Also, although it was necessary to refer to the interface table 215 to create an entry in the step 850 as described above, this is unnecessary in a step 1850. Among the new entries registered in the step 1850, for the 6 items, VR identifier 711 on the V-BAS side, temporary output interface 1712 on the V-BAS side, output interface identifier 715 on the V-BAS side, VR identifier 721 on the V-LB side, temporary output interface identifier 1722 on the V-LB side and output interface identifier 725 on the V-LB-side, the values of the entries selected in the step 840 (VR identifier 601 on the V-BAS side, interface identifier 1602 on the V-BAS side, output interface identifier 1603 from V-BAS, VR identifier 604 on the V-LB side, interface identifier 1605 on the V-LB side and value of the output interface identifier 1606 from V-LB) may be used. As for the other described items, such as input session identifier 713 of the packet from a user, destination IP address prefix 723 of the packet addressed to a user of the new entries, for example, these may be similar to step 850.

Figure 19:
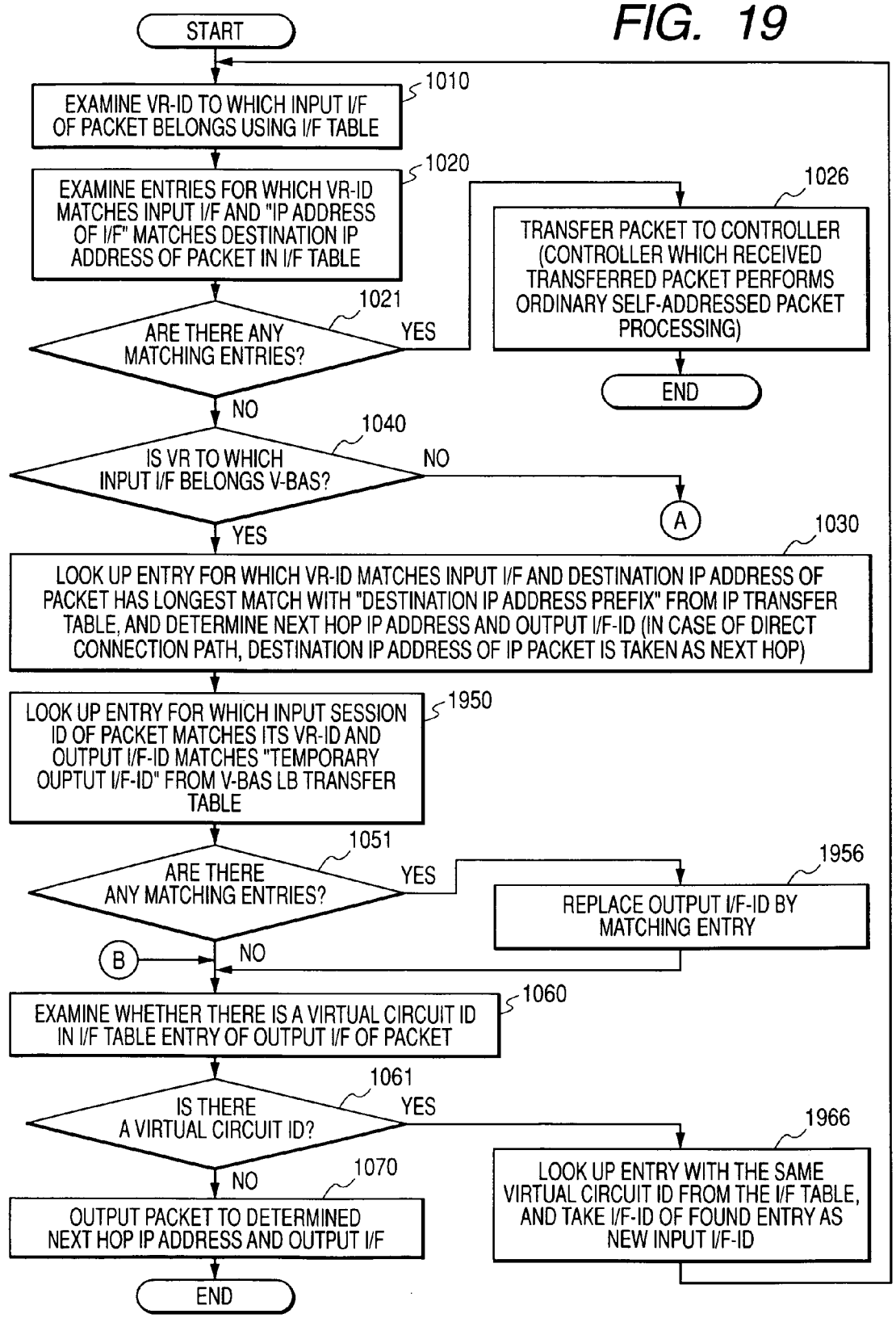
FIG. 19 is a diagram showing the packet forwarding process flow of the communication apparatus according to an aspect of the present invention.

FIG. 19 is a diagram showing the packet forwarding processing flow of the communication apparatus according to an aspect of the present invention. The contents of this processing are similar to those of the packet forwarding processing flow described hereinabove, except that the output interface identifier is used to specify the load balancing relay destination instead of the next hop IP address, and that V-LB operates as a layer 2 load balancing switch.

The processing flow of FIG. 19 comprises 5 items: the determination of the VR to which the input interface belongs (step 1010), determination and processing of a self-addressed packet (from step 1020 to step 1026) determination of the packet destination and processing of the virtual line (step 1060 to step 1061 and step 1966), and output of a packet (step 1070). Among these, except for the determination of the packet destination, the routine is similar to the packet relay processing flow described above. However, whereas the matching of the next hop IP address was checked in the step 1066, V-LB is a layer 2 switch and neither an IP address nor a MAC address is assigned to the circuit interface. Hence in the step 1966, this check is excluded. The aforesaid MAC (Media Access Control) address indicates the layer 2 address assigned to the circuit interface.

As regards the determination of the packet destination, the processing in the case of V-BAS and the case of V-LB is very different. As regards processing in the case of V-BAS (step 1030, step 1950, step 1051, step 1956), this is similar to the determination of forwarding destination by the IP packet forwarding table and the change of load destination by the load balancing forwarding table (step 1030, step 1050, step 1051, step 1056) in the packet forwarding processing flow described above. However, although the next hop IP address is used in the step 1050 and step 1056, an output interface identifier is used instead in a step 1950 and step 1956.

Figure 20:
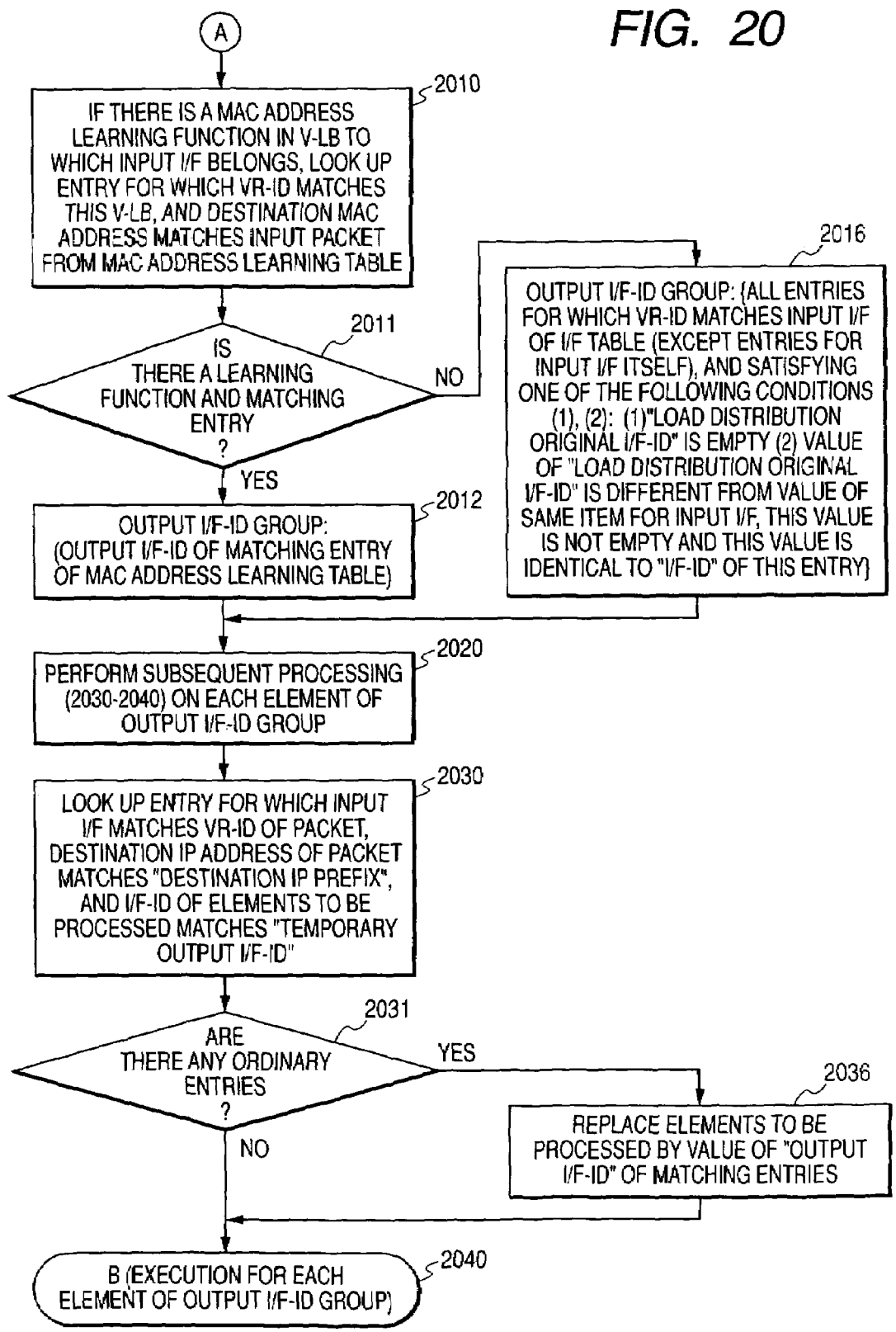
FIG. 20 is a diagram showing the flow of part of the processing performed by the virtual layer 2 load balancer in the packet forwarding processing of the communication apparatus according to an aspect of the present invention.

Referring to FIG. 20, the details of processing in the case of V-LB (processing between A and B of the processing flow of FIG. 19) will now be described.

FIG. 20 is a diagram showing the flow of part of the processing performed by virtual layer 2 load balancing in the packet forwarding processing of the communication apparatus according to an aspect of the present invention.

In the determination processing of the packet destination in V-LB, first, if there is a MAC address learning function in V-LB, an entry is looked up from a MAC address learning table for which the value of the VR identifier matches V-LB, and the value of the MAC address matches the destination MAC address of an input packet (step 2010). As a result, if a matching entry is found (step 2011), only the output interface registered in this entry is taken as an element of an output interface identifier set (step 2012). The routine then proceeds to a step 2020.

If a matching entry is not found, the output interface identifier set its taken as the set of all the circuit interfaces corresponding to entries satisfying one of the following two conditions among all the entries of the interface table 235 for which the VR identifier 501 matches this V-LB (step 2016).

(1) The value of the load balancing source interface identifier 1506 is an empty entry (except for the entry of the input interface), (2) The load balancing source interface identifier 1506 is not empty, and its value is equal to the value of the interface identifier 502 (except for entries for which the value of load balancing source interface identifier 1506 is equal to the value of the load balancing source interface identifier 1506 of the input interface).

In implementing the invention, there may not be any MAC address learning function in V-LB. In other words, except for a load balancing relay function, V-LB may operate as a repeater hub. In this case, steps 2010, 2011 and 2012 are unnecessary, and the determination processing of the packet destination in V-LB is started from the step 2016.

As for the processing after a step 2030, each element of the output interface identifier set is executed separately (step 2020). The processing of the steps 2030, 2031, 2036 is similar to that in the packet forwarding processing flow (steps 1046, 1051, 1056). However, although the next hop IP address is used in the step 1046 and step 1056, an output interface identifier is used instead in the step 2030 and step 2036.

In a step 2040, the routine returns to the main processing flow shown in FIG. 19, but even after returning, processing is performed separately for each element of the output interface identifier set as from the step 2030 to the step 2036.

As shown above, layer 2 performs load balancing relay between V-BAS 1301 and V-LB 1302, V-LB 1302 operates completely as a transparent apparatus by layer 3. Due to this, in addition to the fact that in the network configuration, excess routers are not trapped between the V-BAS 1301 and ISP network edge router 121, it is unnecessary to assign an individual IP address to the interface of V-BAS 1301 or V-LB 1302 connected to the load balancing target apparatus 1311.

Figure 21:
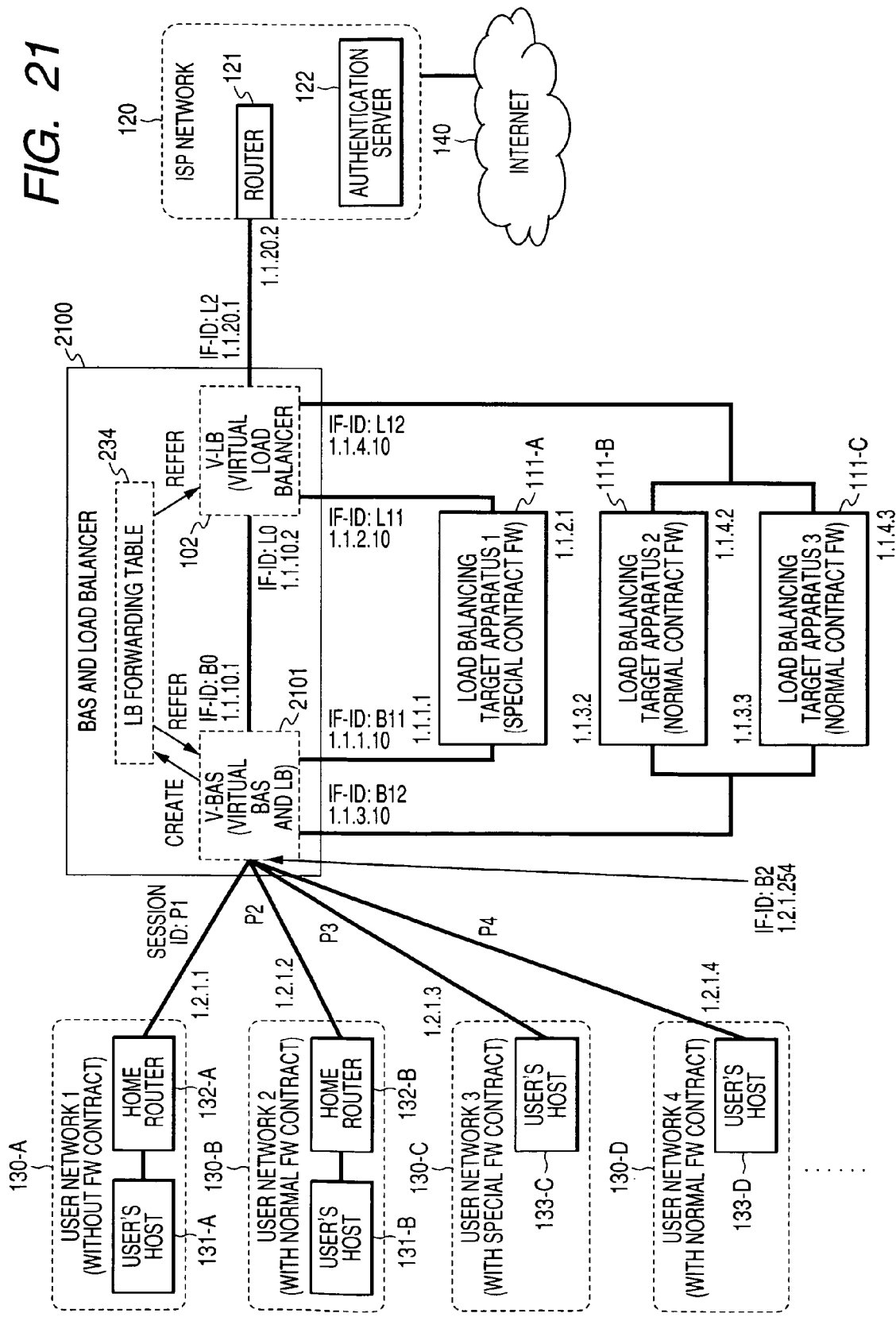
FIG. 21 is a diagram showing the network configuration and the virtual internal configuration of the communication apparatus of the invention in this aspect according to an aspect of the present invention.

FIG. 21 is a diagram showing the network configuration according to an aspect of the present invention, and the virtual internal configuration of the communication apparatus of the invention in this aspect.

The BAS/load balancer 2100 is similar to the BAS/load balancer 100 described herein above, with a load balancing relay process using a service level identifier not performed.

In this aspect, the BAS/load balancer 2100 of the invention provides a different level of service for every user. For example, a firewall service is not provided by the load balancing target apparatus to a user network 1130-A, a firewall service is provided by load balancing target apparatuses 111-B, 111-C for general contract users to a user network 2130-B and user network 4130-D, and a firewall service is provided for special contract users by a load balancing target apparatus 111-A to a user network 3130-C.

In order to realize such a service, V-BAS 2101 in the BAS/load balancer 2100 collates the service level identifier assigned for each user with the service level identifier assigned for each load balancing target apparatus 111, and only the matching load balancing target apparatus 111 is taken as a relay destination candidate for the user's communications traffic. From among these relay destination candidates, the load balancing target apparatus of the relay destination is determined using an arbitrary load balancing algorithm, and registered in the load balancing forwarding table 234.

The packet relay process using the load balancing forwarding table 234 is similar to that described herein above.

FIG. 22 is a diagram showing the session management table according to an aspect of the present invention.

The use of this table is similar to that of the session management table described herein above. However, a service level identifier 2205 with a service level identifier assigned to every user is stored is added.

In the present invention, the method of obtaining the value set as this service level identifier 2205 is not defined. For example, the value of the service level identifier for each user may be registered beforehand in the authentication server 122, and the value of the service level identifier corresponding to the user to be authenticated obtained from the authentication server 122 when a user authentication process is performed during network connection setup. As another method, the administrator may register the value of the service level identifier for each user beforehand in the apparatus of the invention, or the value of the service level identifier may be included in a network connection demand which reaches the apparatus of the invention from the home router 132 or user host 133.

Although 0 is used as the value of the specific service level identifier of FIG. 22, the service level identifier 0 in this aspect expresses that communications traffic is relayed through a virtual line provided between V-BAS and V-LB without passing through the load balancing apparatus 111. Of course, values other than 0 may be used for the service level identifier representing such a relay method, or alternatively, no such relay method need be provided to the user.

FIG. 23 is a diagram showing the load balancing target candidate table according to an aspect of the present invention. The use of this table is similar to the load balancing target candidate table described hereinabove. However, a new service level identifier 2307 with the service level identifier assigned to each load balancing target apparatus is stored may be newly provided.

The apparatus of the invention compares the user's service level identifier 2205 with the service level identifier 2307 of the entries in the load balancing target candidate table 213 when a network connection setup process is performed for a user, and excludes conflicting entries from the load balancing relay destination candidates assigned to the user. The other processing is similar to the processing for the load balancing target candidate table described hereinabove.

FIG. 24 is a diagram showing the load balancing forwarding table according to an aspect of the present invention. The use and composition of this table are similar to that described hereinabove. However, a service level identifier is added to the material used to determine the load balancing relay destination, so the actual values stored in this table do not necessarily match those described above.

Figure 25:
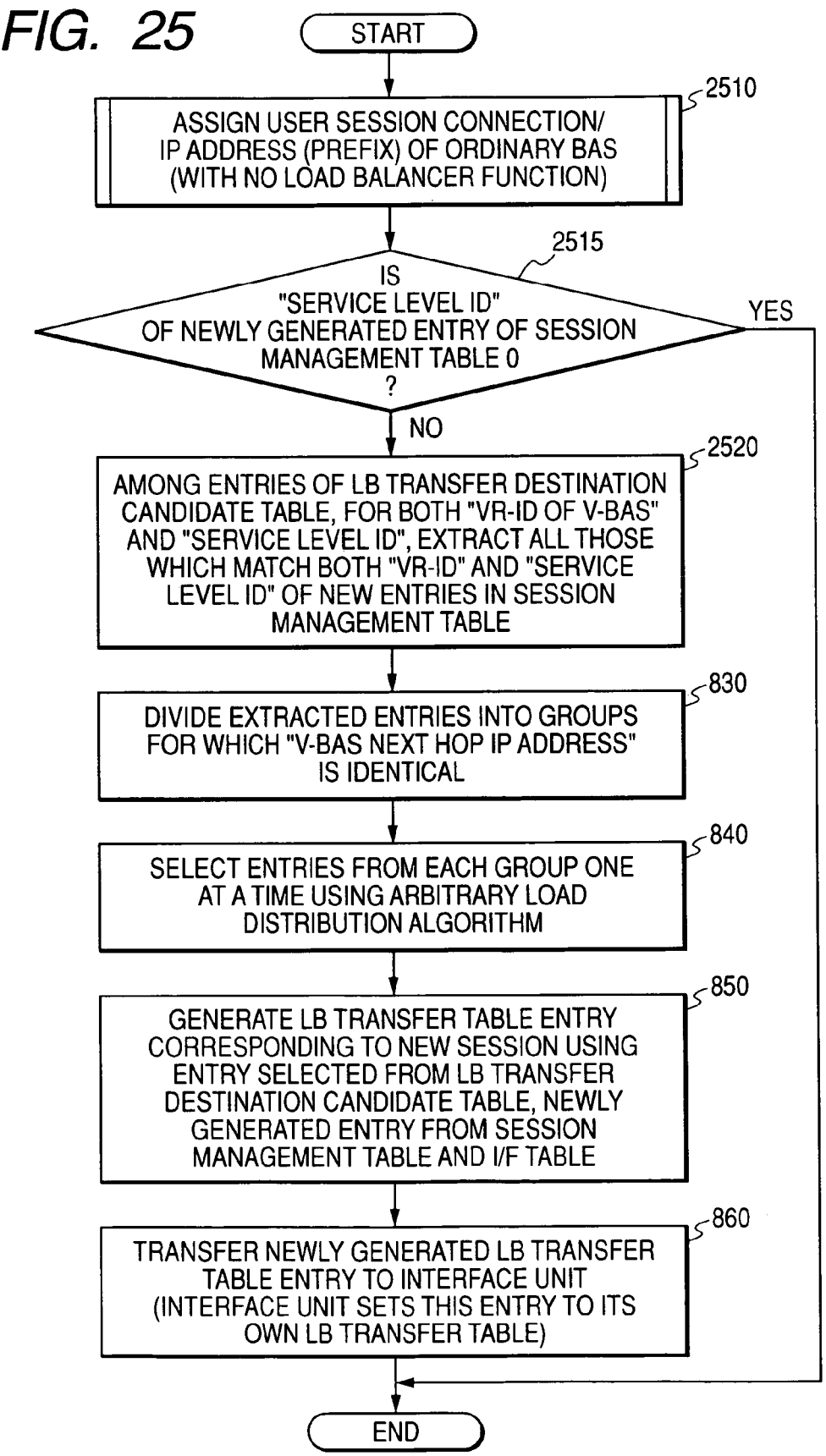
FIG. 25 is a diagram showing the entry creation processing flow of the load balancing forwarding table according to an aspect of the present invention.

FIG. 25 is a diagram showing the entry creation processing flow of the load balancing forwarding table according to an aspect of the present invention.

The details of this processing are similar to those of the entry creation processing flow of the load balancing forwarding table describe hereinabove in addition to the description below.

Although in the step 810, the service level identifier is not treated, in a step 2510, the value of a suitable service level identifier 2205 is set for every user in the session management table 211.

In order to handle users for whom the service level identifier is 0, a step 2515 is provided immediately after the step 2510. As regards a user for whom the value of the service level identifier 2205 of the session management table 211 is 0, the entry creation process is terminated without creating entries in the load balancing forwarding table.

In the step 820, only entries for which the VR identifier corresponds are extracted, but in the step 2520, only entries for which the VR identifier and service level identifier match are extracted.

Figure 26:
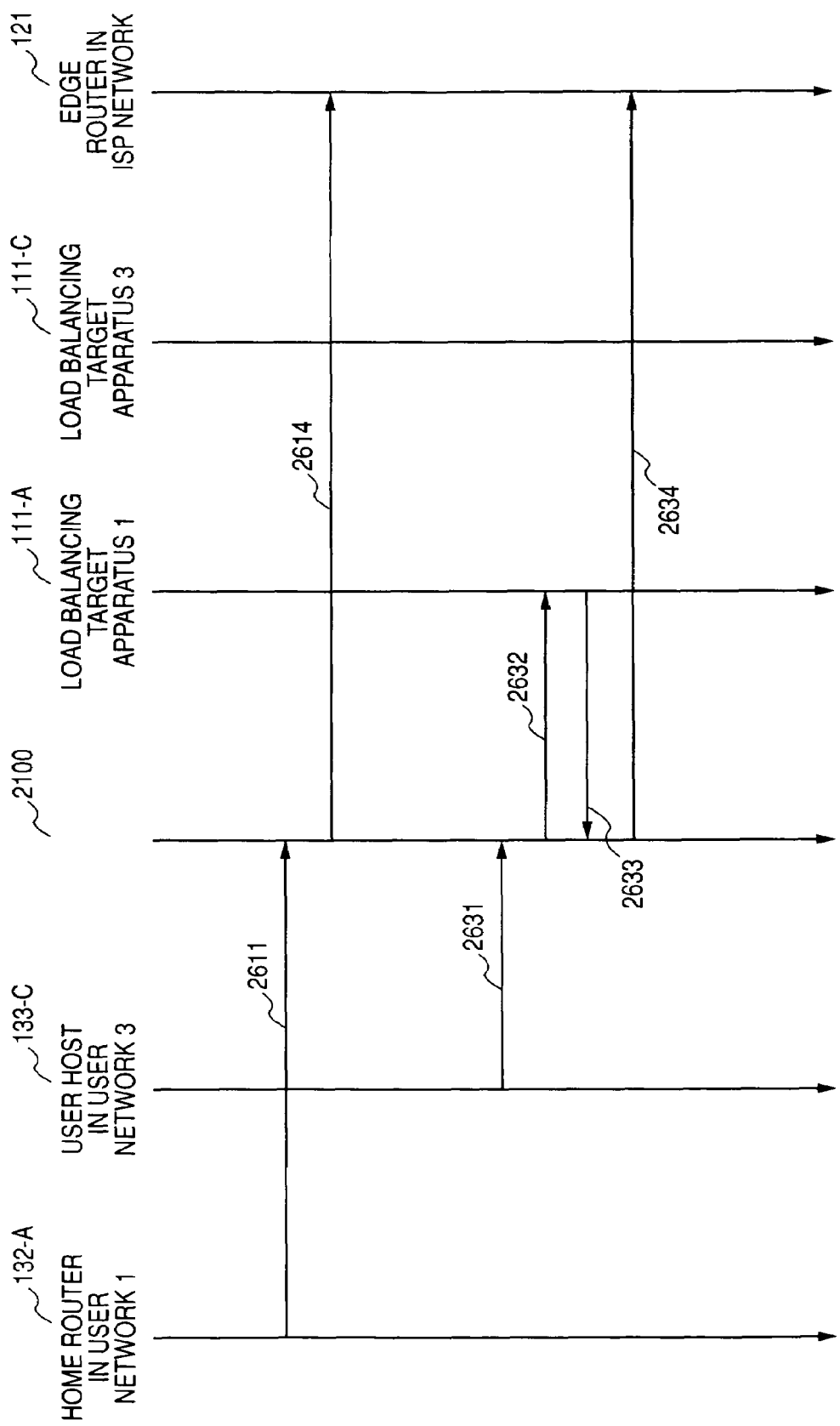
FIG. 26 is a diagram showing a send/receive sequence when the communication apparatus of the invention receives an IP packet inside an ISP network or which is addressed to a host in the Internet from a user network, and relays it to the ISP network according to an aspect of the present invention.

FIG. 26 is a diagram showing a send/receive sequence according to an aspect of the present invention when the communication apparatus of the invention receives an IP packet inside an ISP network, or which is addressed to a host in the Internet from a user network, and relays it to the ISP network.

Hereafter, the case (steps 2611 and 2614) will be described where the apparatus of the invention receives an IP packet from a user network for which the service level identifier is 0. For user networks where the service level identifier is not 0 (steps 2631, 2632, 2633, 2634), similar t that described hereinabove with the addition that since the actual values of the load balancing forwarding table 234 differ, the load balancing apparatus 111 which is the relay destination also differs.

First, the BAS/load balancer 2100 of the invention receives an IP packet from the home router 132 or user host 133 of a user network connected to V-BAS in the apparatus for which the service level identifier is 0 (step 2611). Here, the destination IP address of this packet is taken as the IP address of a host in an ISP network connected to V-LB in the same apparatus as V-BAS, or a network (Internet, etc.) beyond that point.

V-BAS in the apparatus of the invention which receives the packet determines the next hop IP address and output interface based on the packet forwarding processing flow from the user network. In this case, in packet forwarding processing, the next hop IP address and output interface determined using the IP packet forwarding table 232 is used. Therefore, the final next hop IP address is the IP address of V-LB, and the output interface is the interface of a virtual line connected to V-LB. V-BAS in the apparatus of the invention relays the packet to V-LB via the virtual line.

Next, V-LB in the apparatus of the invention determines the next hop IP address and output interface based on the packet forwarding processing flow.

Even in the case of this packet forwarding processing, the next hop IP address and output interface determined using the IP packet forwarding table 232 is used as they are. Therefore, the next hop IP address is the IP address of the ISP network edge router 121, and the output interface is the circuit interface connected to the apparatus. V-LB in the apparatus of the invention relays a packet from the determined output interface to the determined next hop IP address (step 2614). The relayed packet is further relayed by the ISP network edge router and a communication apparatus beyond if necessary, and reaches the final destination host.

Figure 27:
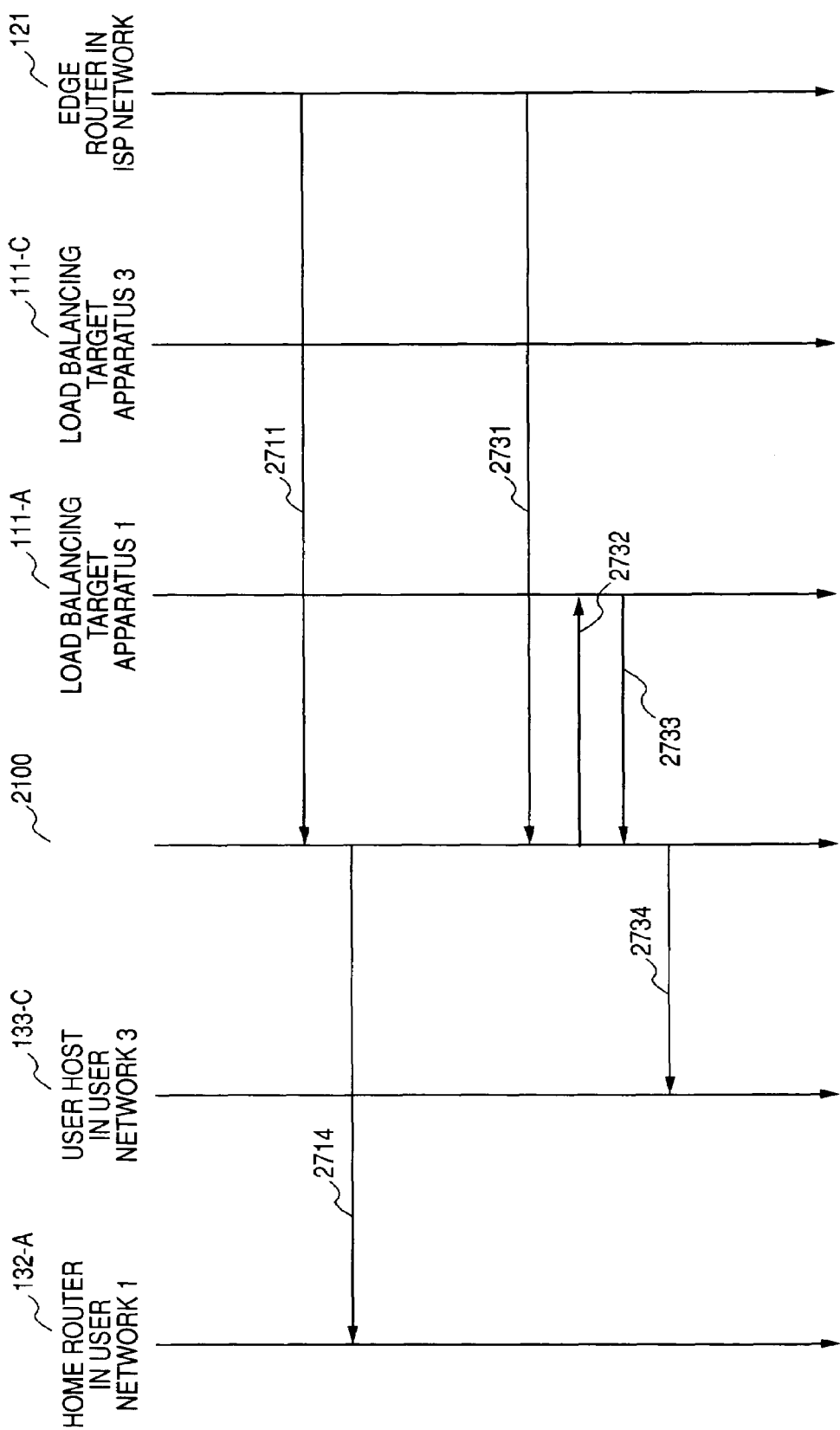
FIG. 27 is a send/receive sequence diagram showing what happens when the communication apparatus of the invention receives an IP packet from the ISP network addressed to a host in a user network, and relays it to the user network according to an aspect of the present invention.

FIG. 27 is a send/receive sequence diagram showing what happens when the communication apparatus of the invention receives an IP packet from an ISP network addressed to a host in a user network, and relays it to the user network.

Hereafter, the case (steps 2711 and 2714) where the apparatus of the invention receives an IP packet traveling to a user network having a service level identifier of 0, will be described. In the case of user networks having service level identifiers other than 0 (steps 2731, 2732, 2733, 2734), except for the case where the load balancing target apparatus 111 which is the relay destination differs because the actual values in the load balancing forwarding table 234 differ, the situation is completely identical to that described hereinabove.

First, the BAS/load balancer 2100 of the invention receives an IP packet from the ISP network edge router 121 connected to V-LB in the apparatus (step 2711). Here, the IP address of this packet is taken as the IP address of a host in a user network connected to V-BAS in the same apparatus as V-LB. V-LB in the apparatus of the invention which receives the packet determines the next hop IP address and output interface based on the packet forwarding processing flow from the ISP network. In this case, in packet forwarding processing, the next hop IP address and output interface determined using the IP packet forwarding table 232 is used. Therefore, the final next hop IP address is the IP address of V-BAS, and the output interface is the interface of a virtual line connected to V-BAS. V-LB in the apparatus of the invention relays the packet to V-BAS via the virtual line.

Next, V-BAS in the apparatus of the invention determines the next hop IP address and output interface based on the packet forwarding processing flow.

In this case, in packet forwarding processing, the next hop IP address and output interface determined using the IP packet forwarding table 232 is used as they are. Therefore, the next hop IP address is the IP address of the home router 132 or user host 133 of a user network which is the destination, and the output interface is the layer 2 session connected to the apparatus. V-BAS in the apparatus of the invention relays the packet from the determined output interface to the determined next hop IP address (step 2714). The relayed packet is further relayed by the home router 132 of the user network and a communication apparatus beyond if necessary, and reaches the final destination host.

In the description hereinabove, service level identifiers are respectively assigned to the load balancing target apparatuses 111 using the load balancing target candidate table 213, and the load balancing forwarding table 214 is created using only the entries for which this value matches the service level identifier assigned to the user. Due to this, the load balancing relay destination candidates of the user traffic to whom a specific service level identifier was assigned can be limited to only the load balancing target apparatuses 111 to which the same service level identifier was assigned. If this is done, in an environment where the user makes network connections dynamically, different service levels can be provided to each user, and a load balancing relay process can also be performed.

In the aforesaid description, processing related to the service level identifier was added to the BAS/load balancer 100 of the invention which performs the layer 3 load balancing relay described hereinabove, but processing related to service level identifiers can of course be added also to the BAS/load balancer 100 of the invention which performs the layer 2 load balancing relay described above.

Figure 28:
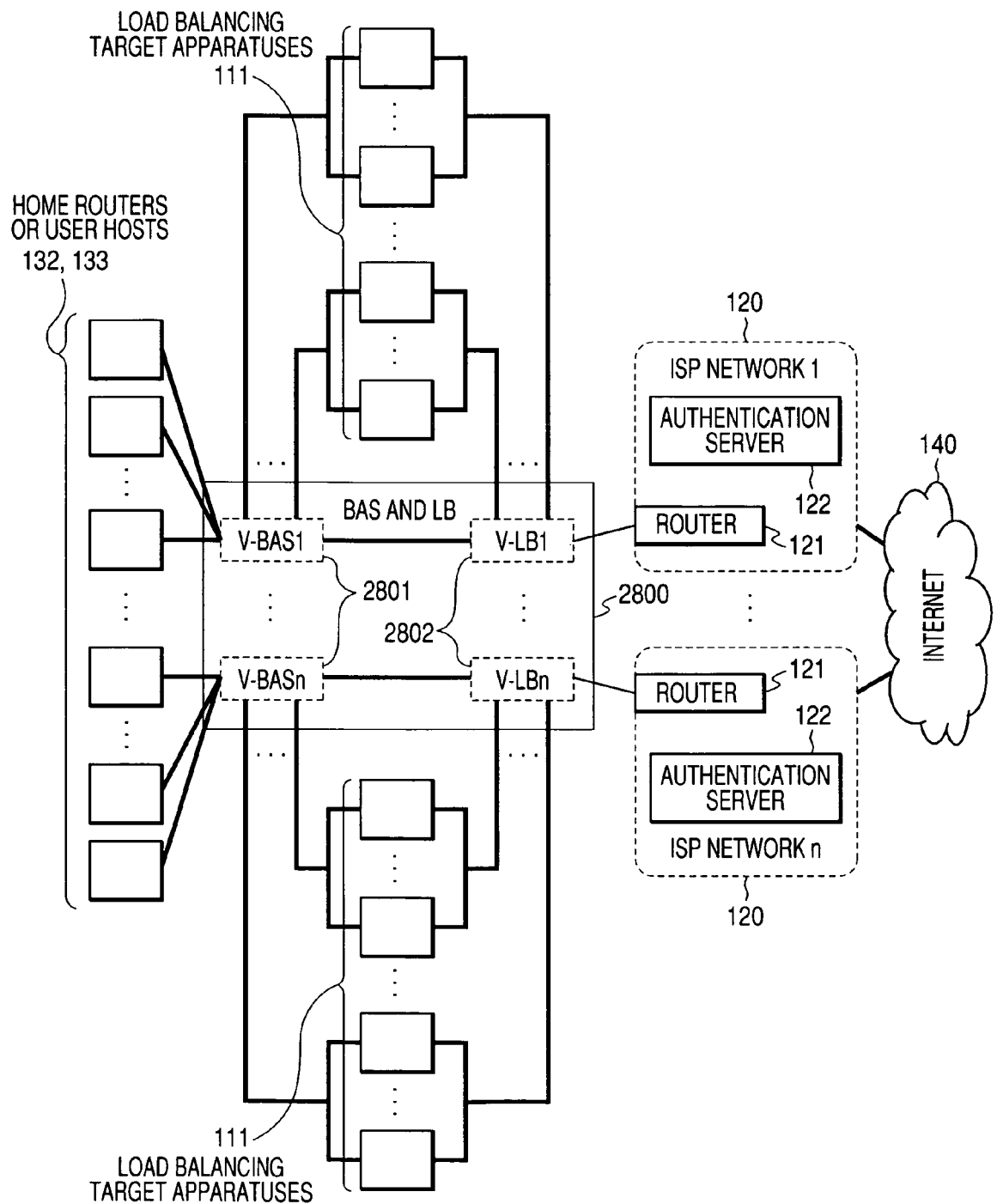
FIG. 28 is a diagram showing the network configuration and the virtual internal configuration of the communication apparatus according to an aspect of the present invention.

FIG. 28 is a diagram showing the network configuration according to an aspect of the present invention, and the virtual internal configuration of the communication apparatus of the invention in this aspect.

The BAS/load balancer 2800 has plural V-BAS 2801, and the same number of V-LB 2802 as V-BAS. The V-BAS 2801 and V-LB 2802 each form pairs, and are connected via an internal virtual line or an external circuit. The load balancing apparatuses 111 are installed midway in these circuits if necessary. The V-LB 2802 are connected to the ISP network edge routers 121 in the ISP networks 120 which are respectively different from each other. V-BAS 2801 receives an Internet access demand from the home router 132 or user host 133 of an ISP user to which a pair of V-LB 2802 are connected, performs user authentication, and provides this user with a connection to the ISP or the Internet.

The pairs of V-BAS 2801 and V-LB 2802 correspond to the BAS/load balancing of the invention described hereinabove.

By having plural pairs in one apparatus, plural ISP can provide a network connection service such as the Internet to a user using one apparatus.

When the administrator changes the setup of the interface table or load balancing target candidate table, which load balancing target apparatus 111 is assigned to which ISP can be flexibly varied.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A packet forwarding apparatus for connecting a first communication apparatus and a second communication apparatus via a network, said packet forwarding apparatus comprising:
    a memory; and
    a processor,
    wherein the packet forwarding apparatus is connected to a plurality of packet processing apparatuses for processing a packet, and
    wherein the packet forwarding apparatus transmits a packet addressed to the second communication apparatus received from the first communication apparatus to one of said plurality of packet processing apparatuses, and the packet forwarding apparatus transmits the packet processed by said one of plurality of packet processing apparatuses to the second communication apparatus, and
    wherein the processor decides more than one relay candidate based on information specifying a service level of a user of the first communication apparatus and a service level of a user of the packet processing apparatuses, and decides one packet processing apparatus from the decided more than one relay candidate to be processing the packets received from the first communication apparatus for each user according to a specific algorithm,
    wherein correspondence information between information specifying the user of the first communication apparatus and information specifying the decided packet processing apparatus is stored in said memory, and
    wherein the packet forwarding apparatus transmits the packet received from the first communication apparatus including information specifying the user of the first communication apparatus to the decided one packet processing apparatus based on the correspondence information.

2. The packet forwarding apparatus according to claim 1, wherein information specifying the user of the communication apparatus and information specifying the one of said plurality of packet processing apparatuses are stored in said memory.

3. The packet forwarding apparatus according to claim 1, wherein the information specifying the user is information identifying a connection between the first communication apparatus and the packet forwarding apparatus.

4. The packet forwarding apparatus according to claim 3, wherein the information identifying the connection between the first communication apparatus and the packet forwarding apparatus is a session identifier.

5. The packet forwarding apparatus according to claim 1, wherein the information specifying the user is an IP address of the first communication apparatus.

6. The packet forwarding apparatus according to claim 1, wherein correspondence information specifying an IP address of the first communication apparatus and information specifying the one of said plurality of packet processing apparatuses are stored in the memory; and
wherein when said processor receives a packet addressed to the first communication apparatus from the second communication apparatus, said processor decides to transmit the packet addressed to the first communication apparatus to the communication apparatus.

7. The packet forwarding apparatus according to claim 1, wherein when said processor receives the packet including the information specifying the user of the first communication apparatus, said processor determines the one of said plurality of packet processing apparatuses which should process a packet received from the first communication apparatus according to a specific algorithm.

8. The packet forwarding apparatus according to claim 1, further comprising:
a first virtual communication apparatus and a second virtual communication apparatus,
wherein said first virtual communication apparatus receives a packet addressed to said second communication apparatus from the first communication apparatus, and transmits this packet to the one of said plurality of packet processing apparatuses; and
said second virtual communication apparatus receives a packet from the one of said plurality of packet processing apparatuses, and transmits the packet to the second communication apparatus.

9. The packet forwarding apparatus according to claim 8, wherein said second virtual communication apparatus receives a packet addressed to the first communication apparatus from the second communication apparatus, and transmits the packet to the of said plurality of packet processing apparatuses, and said first virtual communication apparatus receives a packet from the one of said plurality of packet processing apparatuses, and transmits the packet to the first communication apparatus.

10. The packet forwarding apparatus according to claim 8, further comprising:
a plurality of first virtual communication apparatuses; and
a plurality of second virtual communication apparatuses.

11. The packet forwarding apparatus according to claim 1, further comprising:
an authentication apparatus connected to the apparatus,
wherein when an interface receives a packet from the first communication apparatus, the interface transmits authentication data about the first communication apparatus to said authentication apparatus, and receives the information specifying the user of the first communication apparatus from said authentication apparatus.

12. The packet forwarding apparatus according to claim 1, wherein said processor determines which of said plurality of packet processing apparatuses transmits a packet received from the first communication apparatus based on the information specifying the user of the first communication apparatus, and information specifying a service level of the user;
correspondence information between information specifying the user and information specifying the determined packet processing apparatus are stored in the memory; and
an interface transmits a packet received from the first communication apparatus to the one of said plurality of packet processing apparatuses based on the correspondence information.

13. The packet forwarding apparatus according to claim 12, wherein the information specifying a service level of a user is received and acquired from the first communication apparatus.

14. The packet forwarding apparatus according to claim 12, further comprising:
an authentication apparatus connected to the packet forwarding apparatus,
wherein the information specifying said service level of the user is received and acquired from said authentication apparatus.

15. The packet forwarding apparatus according to claim 14, wherein remote authentication dial-in user service is used as a communication protocol with said authentication apparatus.

16. The packet forwarding apparatus according to claim 1, wherein a point-to-point protocol is used as a communication protocol with the first communication apparatus.

17. The packet forwarding apparatus according to claim 1, wherein a dynamic host configuration protocol is used as a connection protocol with the first communication apparatus.

18. The packet forwarding apparatus according to claim 11, wherein remote authentication dial-in user service is used as a communication protocol with said authentication apparatus.

19. The packet forwarding apparatus according to claim 1, wherein said plurality of packet processing apparatuses are installed in the packet forwarding apparatus.

20. The packet forwarding apparatus according to claim 1, wherein the information specifying the user is information identifying a connection between the first communication apparatus and the packet forwarding apparatus assigned by the packet forwarding apparatus, and
said processor determines which of said plurality of packet processing apparatuses transmitted the packet received from the first communication apparatus based on the information specifying the user when the packet forwarding apparatus assigns the information specifying the user to the first communication apparatus.

* * * * *

UNITED STATES PATENT AND TRADEMARK OFFICE
CERTIFICATE OF CORRECTION

PATENT NO. : 7,643,421 B2 Page 1 of 1
APPLICATION NO. : 11/291821
DATED : January 5, 2010
INVENTOR(S) : Tsuge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 825 days.

Signed and Sealed this

Sixteenth Day of November, 2010

David J. Kappos
*Director of the United States Patent and Trademark Office*